(12) United States Patent
Will et al.

(10) Patent No.: US 10,390,618 B2
(45) Date of Patent: Aug. 27, 2019

(54) WALL MOUNTABLE OBJECT SUPPORT SYSTEM AND RELATED ACCESSORIES

(71) Applicant: THE HILLMAN GROUP, INC., Cincinnati, OH (US)

(72) Inventors: Gary E. Will, Gold Canyon, AZ (US); Byron K. Grice, Phoenix, AZ (US); Michael J. Schmidt, Gilbert, AZ (US); Wayne R. Mayville, Phoenix, AZ (US)

(73) Assignee: THE HILLMAN GROUP, INC., Cincinnati, OH (US)

( * ) Notice: Subject to any disclaimer, the term of this patent is extended or adjusted under 35 U.S.C. 154(b) by 64 days.

(21) Appl. No.: 15/425,513

(22) Filed: Feb. 6, 2017

(65) Prior Publication Data

US 2017/0231388 A1 Aug. 17, 2017

Related U.S. Application Data

(60) Provisional application No. 62/337,366, filed on May 17, 2016, provisional application No. 62/295,257, filed on Feb. 15, 2016.

(51) Int. Cl.

| A47B 55/02 | (2006.01) |
|---|---|
| A47B 95/00 | (2006.01) |
| A47B 47/02 | (2006.01) |
| A47F 5/08 | (2006.01) |
| B25H 3/04 | (2006.01) |
| F16B 15/00 | (2006.01) |

(52) U.S. Cl.
CPC ............ *A47B 95/008* (2013.01); *A47B 47/02* (2013.01); *A47F 5/083* (2013.01); *B25H 3/04* (2013.01); *F16B 15/00* (2013.01)

(58) Field of Classification Search
CPC .. A47B 55/02; A47F 5/01; A47F 5/083; A47F 5/0853; F16B 2/10
USPC ............................................. 211/106; D6/566
See application file for complete search history.

(56) References Cited

U.S. PATENT DOCUMENTS

| 113,862 | A | 4/1871 | Duffett |
|---|---|---|---|
| 251,616 | A | 12/1881 | McGill |
| 297,173 | A | 4/1884 | Seliger |
| 371,205 | A | 10/1887 | McConnoughay |
| 423,730 | A | 3/1890 | Charlton |
| 444,933 | A | 1/1891 | Barnes |
| 489,593 | A | 1/1893 | Ramer |

(Continued)

FOREIGN PATENT DOCUMENTS

| CN | 2449598 Y | 9/2001 |
|---|---|---|
| CN | 201542372 U | 8/2010 |

(Continued)

*Primary Examiner* — Bradley Duckworth
(74) *Attorney, Agent, or Firm* — Thompson Hine L.L.P.

(57) ABSTRACT

A wall mounted object support system includes a grid member with a peripheral portion proximate a wall and a body portion offset from the peripheral portion and spaced further away from the wall than the peripheral portion. The grid member is formed by a plurality of spaced apart first elongated rod or wire portions each running in a first direction and a plurality of spaced apart second rod or wire portions each running in a second direction that is substantially perpendicular to the first direction. One or more of a support block and/or pivoting anchor components may be used to hold the grid member against the wall.

20 Claims, 29 Drawing Sheets

(56) References Cited

U.S. PATENT DOCUMENTS

| | | |
|---|---|---|
| 763,448 A | 6/1904 | Winter |
| 769,794 A | 9/1904 | Fowler |
| 777,879 A | 12/1904 | Blum |
| 795,704 A | 7/1905 | Jones |
| 874,412 A | 12/1907 | Lewis |
| 938,998 A | 11/1909 | Evans |
| 965,151 A | 7/1910 | Benjamin |
| 992,203 A | 5/1911 | Johnson |
| 998,015 A | 7/1911 | Kopsa |
| 1,002,910 A | 9/1911 | Foote |
| 1,270,718 A | 6/1918 | Ford |
| 1,306,114 A * | 6/1919 | Koval ............... E06B 9/50 248/267 |
| 1,343,855 A | 6/1920 | Tyler |
| 1,425,873 A | 8/1922 | Lineaweaver |
| 1,651,392 A | 12/1927 | Honigbaum |
| 1,802,934 A | 4/1931 | Balch |
| 1,883,834 A | 10/1932 | Turner |
| 1,958,497 A | 5/1934 | Rivers |
| 2,062,887 A | 12/1936 | Karst |
| 2,119,931 A | 6/1938 | Smith |
| 2,295,370 A | 9/1942 | Tritt |
| 2,317,368 A | 4/1943 | Frey |
| 2,334,700 A | 11/1943 | Frey |
| 2,505,324 A | 4/1950 | Cornelius |
| 2,539,825 A | 1/1951 | Genua |
| 2,577,011 A | 12/1951 | Hallenscheid |
| 2,751,807 A | 6/1956 | Harre |
| 2,980,309 A | 4/1961 | Papas Louis |
| 3,001,752 A | 9/1961 | Loy |
| 3,004,815 A | 10/1961 | O'Kain |
| 3,020,602 A | 2/1962 | Siering |
| 3,029,056 A | 4/1962 | Breglia |
| 3,174,592 A | 3/1965 | Berman |
| 3,226,065 A | 12/1965 | Smith |
| 3,298,651 A | 1/1967 | Passer |
| 3,319,917 A | 5/1967 | Bilodeau |
| 3,425,568 A | 2/1969 | Albright |
| 3,482,706 A | 12/1969 | Stewart |
| 3,503,147 A | 3/1970 | Herrin |
| 3,524,584 A | 8/1970 | Ihlenfeld |
| 3,620,404 A | 11/1971 | Grasso |
| 3,640,497 A | 2/1972 | Waki |
| 3,666,936 A | 5/1972 | Webster |
| 3,685,778 A | 8/1972 | Berns |
| 3,754,805 A | 8/1973 | Pangburn |
| 3,775,884 A | 12/1973 | Smith |
| 3,799,072 A | 3/1974 | Slaboden |
| 3,813,800 A | 6/1974 | Turner |
| 3,859,002 A | 1/1975 | Sauey |
| 3,861,631 A | 1/1975 | Shorin |
| 3,891,172 A | 6/1975 | Einhorn |
| 3,912,211 A | 10/1975 | Topf |
| 3,926,394 A | 12/1975 | Mauceri et al. |
| 3,966,157 A | 6/1976 | Corral et al. |
| 3,995,822 A | 12/1976 | Einhorn et al. |
| 4,017,048 A | 4/1977 | Einhorn |
| 4,039,138 A | 8/1977 | Einhorn |
| 4,040,149 A | 8/1977 | Einhorn |
| 4,082,243 A | 4/1978 | Watt |
| 4,083,314 A | 4/1978 | Garvin |
| 4,124,189 A | 11/1978 | Einhorn |
| 4,134,625 A | 1/1979 | Palka |
| D255,301 S | 6/1980 | Windisch |
| 4,208,012 A | 6/1980 | Dutcher |
| 4,221,442 A | 9/1980 | Harangozo |
| 4,228,982 A | 10/1980 | Sellera |
| 4,234,094 A * | 11/1980 | Jorgensen ............... A47J 47/16 211/106 |
| 4,237,630 A | 12/1980 | Franzone |
| 4,262,605 A | 4/1981 | Sokol |
| 4,270,821 A | 6/1981 | Verdesca |
| 4,293,173 A | 10/1981 | Tricca |
| 4,294,778 A | 10/1981 | DeLuca |
| 4,300,745 A | 11/1981 | Peterson |
| 4,304,447 A | 12/1981 | Ellwood |
| 4,317,603 A | 3/1982 | Pepicelli |
| 4,333,625 A | 6/1982 | Haug |
| 4,340,144 A | 7/1982 | Cousins |
| 4,372,450 A | 2/1983 | Licari |
| 4,422,608 A | 12/1983 | Hogg |
| 4,452,500 A | 6/1984 | Zlotnik |
| 4,458,387 A | 7/1984 | Pearson |
| 4,485,995 A | 12/1984 | Hogg |
| 4,505,226 A | 3/1985 | Carlson |
| 4,506,856 A | 3/1985 | Rich |
| 4,572,380 A | 2/1986 | Langwell |
| 4,583,647 A | 4/1986 | Schinzing |
| D285,743 S | 9/1986 | Richwine |
| 4,613,108 A | 9/1986 | Sundstrom et al. |
| D286,118 S | 10/1986 | Gecchelin |
| 4,655,423 A | 4/1987 | Schavilje et al. |
| 4,681,380 A | 7/1987 | Carlin |
| 4,831,754 A | 5/1989 | Tallent |
| 4,842,230 A * | 6/1989 | Cobb ............... A47F 5/083 211/106 |
| 4,932,519 A | 6/1990 | Trauschke |
| 4,976,057 A | 12/1990 | Bianchi |
| 4,998,361 A | 3/1991 | Gordon |
| 5,107,601 A | 4/1992 | Semchuck |
| 5,110,080 A | 5/1992 | Rieman |
| 5,135,194 A | 8/1992 | Laughon |
| 5,149,037 A | 9/1992 | Smith |
| 5,241,715 A | 9/1993 | Duvall |
| 5,265,357 A | 11/1993 | Yu |
| 5,267,719 A | 12/1993 | Keller |
| 5,325,815 A | 7/1994 | Gumpesberger |
| 5,332,108 A | 7/1994 | Blass |
| 5,351,842 A * | 10/1994 | Remmers ............... A47B 96/028 108/152 |
| 5,372,346 A | 12/1994 | Upchurch |
| 5,401,094 A | 3/1995 | Walsten |
| 5,477,010 A | 12/1995 | Buckshaw |
| 5,484,126 A | 1/1996 | Kitchin |
| 5,495,954 A | 3/1996 | Schmidt |
| 5,507,248 A | 4/1996 | Gabbed |
| 5,517,947 A | 5/1996 | Christman |
| 5,570,938 A | 11/1996 | Butler |
| 5,586,934 A | 12/1996 | Dombrowski |
| 5,638,644 A | 6/1997 | Bastian |
| 5,641,079 A | 6/1997 | Schmidt |
| 5,727,698 A | 3/1998 | Lai |
| 5,743,038 A | 4/1998 | Soto |
| 5,806,223 A | 9/1998 | Visagie |
| D399,692 S | 10/1998 | Wilcox |
| 5,819,958 A | 10/1998 | Dement |
| 5,839,649 A | 11/1998 | Clark |
| 5,878,988 A | 3/1999 | Rakower |
| 6,042,243 A | 3/2000 | Grill |
| 6,045,374 A | 4/2000 | Candeloro |
| 6,051,788 A | 4/2000 | Nichols |
| 6,109,461 A | 5/2000 | Kluge |
| 6,082,560 A | 7/2000 | Timm |
| 6,126,126 A | 10/2000 | McKiernan, Jr. |
| D434,303 S | 11/2000 | DeCosta |
| 6,158,828 A | 12/2000 | Vacovsky |
| D436,841 S | 1/2001 | Carpenter |
| 6,173,848 B1 | 1/2001 | Bravo |
| 6,179,136 B1 | 1/2001 | Kluge |
| 6,196,141 B1 | 3/2001 | Herron, III et al. |
| 6,202,838 B1 | 3/2001 | Tran |
| 6,260,489 B1 | 7/2001 | Weaver et al. |
| 6,279,862 B1 | 8/2001 | Gershowitz |
| 6,299,001 B1 | 10/2001 | Frolov |
| 6,325,345 B1 | 12/2001 | Carpenter |
| 6,351,905 B1 | 3/2002 | Dean |
| 6,357,608 B1 | 3/2002 | Timm |
| 6,371,427 B1 | 4/2002 | Johnson |
| 6,431,510 B1 | 8/2002 | Puritz |
| D465,348 S | 11/2002 | Lucatello |
| 6,478,273 B1 | 11/2002 | McKiernan, Jr. et al. |
| 6,520,355 B1 | 2/2003 | Pritchard et al. |
| 6,585,205 B2 | 7/2003 | Beaty |
| 6,641,107 B1 | 11/2003 | Janssen |

(56) References Cited

U.S. PATENT DOCUMENTS

| | | | |
|---|---|---|---|
| 6,641,344 B2 | 11/2003 | Weiss | |
| 6,644,609 B1 | 11/2003 | Scott | |
| 6,659,295 B1 | 12/2003 | De Land et al. | |
| 6,663,201 B2 | 12/2003 | Herron, III et al. | |
| D486,057 S | 2/2004 | Chen | |
| 6,726,034 B2 | 4/2004 | Holbrook et al. | |
| D494,452 S | 8/2004 | Sheldon et al. | |
| 6,775,935 B1 | 8/2004 | Cohen et al. | |
| 6,830,228 B2 | 12/2004 | Ernst | |
| 6,932,225 B2 | 8/2005 | Rowe | |
| D511,088 S | 11/2005 | Chiu | |
| D513,562 S | 1/2006 | Boffo | |
| D515,911 S | 2/2006 | McDuff | |
| 6,994,448 B1 | 2/2006 | Gorrell | |
| D516,412 S | 3/2006 | McDuff | |
| D517,344 S | 3/2006 | Zens | |
| 7,086,543 B2 | 8/2006 | Remmers | |
| 7,146,760 B2 | 12/2006 | Yiu | |
| 7,152,748 B2 * | 12/2006 | Vosbikian | A47F 5/01 211/87.01 |
| 7,225,935 B2 | 6/2007 | Breymaier | |
| 7,395,998 B2 | 7/2008 | Peterson | |
| 7,398,013 B2 | 7/2008 | He | |
| 7,431,258 B2 | 10/2008 | Lamotta | |
| 7,478,785 B2 | 1/2009 | Herron, III et al. | |
| 7,497,028 B2 | 3/2009 | Nevers et al. | |
| 7,506,772 B2 | 3/2009 | Chen | |
| D596,930 S | 7/2009 | Gaudron | |
| 7,591,097 B2 | 9/2009 | Alman | |
| D606,185 S | 12/2009 | Wefler | |
| 7,669,723 B2 | 3/2010 | Kao | |
| 7,694,401 B2 | 4/2010 | Peterson | |
| 7,708,252 B2 | 5/2010 | Vander Berg et al. | |
| 7,900,783 B2 | 3/2011 | Fernandez | |
| D635,843 S | 4/2011 | McDuff et al. | |
| D636,256 S | 4/2011 | McDuff et al. | |
| 7,931,159 B2 | 4/2011 | Kao | |
| 7,967,268 B2 | 6/2011 | Herron, III et al. | |
| RE42,649 E | 8/2011 | Schultz | |
| D649,022 S | 11/2011 | McDuff et al. | |
| D649,023 S | 11/2011 | McDuff et al. | |
| D649,436 S | 11/2011 | McDuff et al. | |
| D649,437 S | 11/2011 | McDuff et al. | |
| D649,438 S | 11/2011 | McDuff et al. | |
| D649,439 S | 11/2011 | McDuff et al. | |
| D650,261 S | 12/2011 | McDuff et al. | |
| 8,074,603 B2 | 12/2011 | Ohlman | |
| 8,087,521 B2 | 1/2012 | Schwartzkopf et al. | |
| 8,114,226 B2 | 2/2012 | Ernst et al. | |
| 8,146,755 B2 | 4/2012 | Schwartzkopf et al. | |
| 8,177,079 B2 | 5/2012 | Schwartzkopf et al. | |
| 8,210,368 B2 | 7/2012 | Schwartzkopf | |
| 8,256,628 B2 | 9/2012 | Stafford et al. | |
| 8,272,610 B2 | 9/2012 | Ernst et al. | |
| 8,308,116 B2 | 11/2012 | Daniels | |
| 8,317,148 B2 | 11/2012 | Ernst et al. | |
| D672,224 S | 12/2012 | Brinson et al. | |
| 8,333,356 B2 | 12/2012 | Ernst et al. | |
| 8,398,048 B2 | 3/2013 | Popkin et al. | |
| 8,414,239 B2 | 4/2013 | McDuff | |
| 8,434,629 B2 | 5/2013 | Fernanadez | |
| 8,448,910 B2 | 5/2013 | Ernst et al. | |
| 8,517,189 B2 | 8/2013 | Donohoe | |
| RE44,504 E | 9/2013 | Schultz | |
| 8,667,701 B1 | 3/2014 | Geesaman | |
| 8,667,765 B1 | 3/2014 | McCarthy | |
| 8,740,171 B2 | 6/2014 | Crescenzo | |
| 8,757,570 B2 | 6/2014 | Ernst et al. | |
| 8,813,404 B2 | 8/2014 | Goppion | |
| 8,833,876 B2 | 9/2014 | Lee | |
| 8,839,964 B2 | 9/2014 | Hawkins | |
| 8,857,780 B1 | 10/2014 | Goss | |
| D717,114 S | 11/2014 | Katterheinrich | |
| 8,974,166 B2 | 3/2015 | McDuff | |
| 8,979,296 B2 * | 3/2015 | Wiemer | A47F 5/103 362/125 |
| D731,716 S | 6/2015 | Kuiper | |
| 9,044,110 B2 | 6/2015 | McDuff et al. | |
| 9,151,585 B2 | 10/2015 | Sanchez | |
| D744,773 S | 12/2015 | Yoon | |
| 9,226,601 B2 * | 1/2016 | Maurer | A47F 5/083 |
| 9,261,229 B2 | 2/2016 | Callif et al. | |
| 9,296,552 B2 | 3/2016 | Schleuning | |
| 9,307,837 B2 | 4/2016 | Wood | |
| 9,380,885 B1 | 7/2016 | Nguyen | |
| 9,496,695 B2 | 11/2016 | Battaglia | |
| 9,563,078 B2 | 2/2017 | Ryu | |
| 9,593,523 B1 | 3/2017 | Trimble | |
| D783,907 S | 4/2017 | Ohlman | |
| 9,668,596 B2 | 6/2017 | Crescenzo | |
| D797,464 S | 9/2017 | Vitale | |
| 9,826,828 B1 | 11/2017 | Vaughan | |
| D804,287 S | 12/2017 | Baldwin | |
| 2002/0026736 A1 | 3/2002 | Spencer | |
| 2002/0088912 A1 | 7/2002 | Yu | |
| 2002/0182910 A1 | 12/2002 | Kiughadush | |
| 2003/0052073 A1 | 3/2003 | Dix | |
| 2003/0161680 A1 | 8/2003 | Suckow | |
| 2003/0178545 A1 | 9/2003 | Ernst | |
| 2004/0231218 A1 | 11/2004 | Dominioni | |
| 2004/0261307 A1 | 12/2004 | Siegel | |
| 2005/0000854 A1 | 1/2005 | Madigan | |
| 2005/0279041 A1 | 12/2005 | Staples | |
| 2006/0180557 A1 | 8/2006 | Weinstein | |
| 2006/0182517 A1 | 8/2006 | McDuff | |
| 2007/0006504 A1 | 1/2007 | Kao | |
| 2007/0063119 A1 | 3/2007 | Huang | |
| 2007/0084743 A1 | 4/2007 | Chu | |
| 2007/0119805 A1 * | 5/2007 | Nawrocki | A47B 55/02 211/119 |
| 2007/0124910 A1 | 6/2007 | Peterson et al. | |
| 2007/0194202 A1 | 8/2007 | Lamotta | |
| 2007/0205344 A1 | 9/2007 | Liermann et al. | |
| 2007/0235622 A1 | 10/2007 | Baran et al. | |
| 2007/0256850 A1 | 11/2007 | Hanse | |
| 2008/0053934 A1 | 3/2008 | Newbould et al. | |
| 2008/0142660 A1 | 6/2008 | Goldberg | |
| 2008/0187688 A1 | 8/2008 | Gunther | |
| 2008/0251682 A1 | 10/2008 | Repac | |
| 2008/0283205 A1 | 11/2008 | Zimmer | |
| 2008/0296456 A1 | 12/2008 | Lien | |
| 2008/0302936 A1 | 12/2008 | Forbes | |
| 2009/0015121 A1 | 1/2009 | Sampson | |
| 2009/0145804 A1 | 6/2009 | Kabel | |
| 2009/0307953 A1 | 12/2009 | Ahlstrom | |
| 2010/0005756 A1 | 1/2010 | McDuff | |
| 2010/0084530 A1 | 4/2010 | Lai | |
| 2010/0178448 A1 | 7/2010 | Nakajima | |
| 2010/0193455 A1 | 8/2010 | Russell et al. | |
| 2010/0213333 A1 | 8/2010 | Mejia et al. | |
| 2010/0219312 A1 | 9/2010 | Johnson et al. | |
| 2010/0300999 A1 | 12/2010 | Schwartzkopf | |
| 2010/0326019 A1 | 12/2010 | Lofgren | |
| 2011/0147236 A1 | 6/2011 | Johnson | |
| 2011/0188250 A1 | 8/2011 | Waldhuetter | |
| 2011/0284701 A1 * | 11/2011 | Brouwer | H02G 3/0443 248/49 |
| 2011/0294320 A1 | 12/2011 | Bennett | |
| 2012/0001039 A1 | 1/2012 | McDuff et al. | |
| 2012/0001040 A1 | 1/2012 | McDuff et al. | |
| 2012/0056051 A1 | 3/2012 | Gold | |
| 2012/0080343 A1 | 4/2012 | Gretz | |
| 2012/0146470 A1 | 6/2012 | Katz | |
| 2013/0026120 A1 * | 1/2013 | Johnson | A47B 55/02 211/85.5 |
| 2013/0105426 A1 | 5/2013 | Dyck | |
| 2014/0144055 A1 | 5/2014 | Byfield | |
| 2014/0212602 A1 | 7/2014 | Thornton | |
| 2014/0231604 A1 | 8/2014 | Long | |
| 2014/0259840 A1 | 9/2014 | Placko | |
| 2014/0263122 A1 | 9/2014 | Roberts | |
| 2014/0263924 A1 | 9/2014 | Crescenzo | |
| 2014/0346310 A1 | 11/2014 | Yang | |

(56) References Cited

U.S. PATENT DOCUMENTS

| | | |
|---|---|---|
| 2015/0016970 A1 | 1/2015 | Smith et al. |
| 2015/0060627 A1 | 3/2015 | Stauber |
| 2015/0308613 A1 | 10/2015 | Callif et al. |
| 2015/0313357 A1* | 11/2015 | David ................ A47B 47/0083 211/187 |
| 2016/0029814 A1 | 2/2016 | Brown |
| 2017/0000270 A1 | 1/2017 | Will |
| 2017/0156495 A1* | 6/2017 | Epicureo ................ A47B 55/02 |
| 2017/0202369 A1* | 7/2017 | Mercier .................. A47F 1/126 |
| 2017/0246546 A1 | 8/2017 | Brown |
| 2017/0347812 A1 | 12/2017 | Will |
| 2018/0055220 A1* | 3/2018 | Epicureo ................ A47F 5/083 |
| 2018/0100617 A1 | 4/2018 | Forrest |

FOREIGN PATENT DOCUMENTS

| | | |
|---|---|---|
| GB | 676903 | 8/1952 |
| WO | WO 1999/052741 | 10/1999 |
| WO | WO 2007/095351 A2 | 8/2007 |
| WO | WO 2015/150222 | 10/2015 |

* cited by examiner

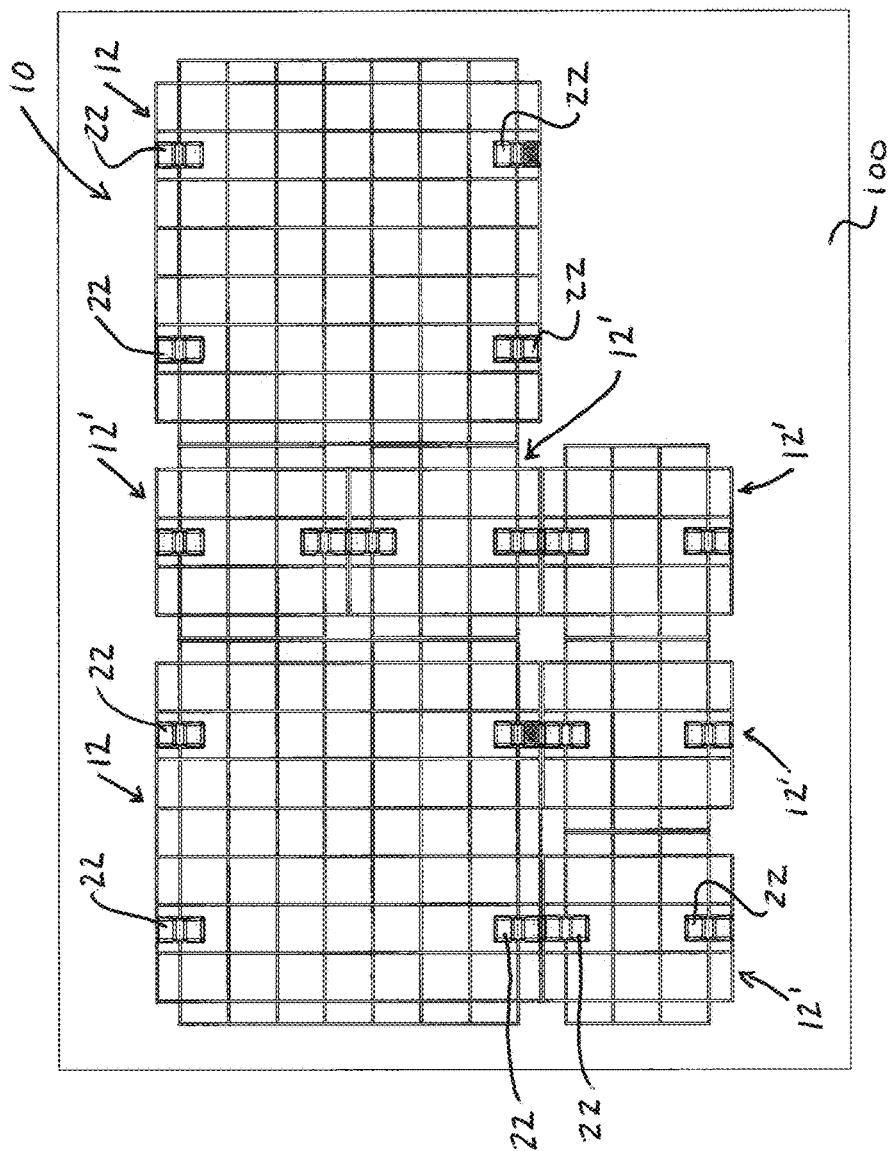

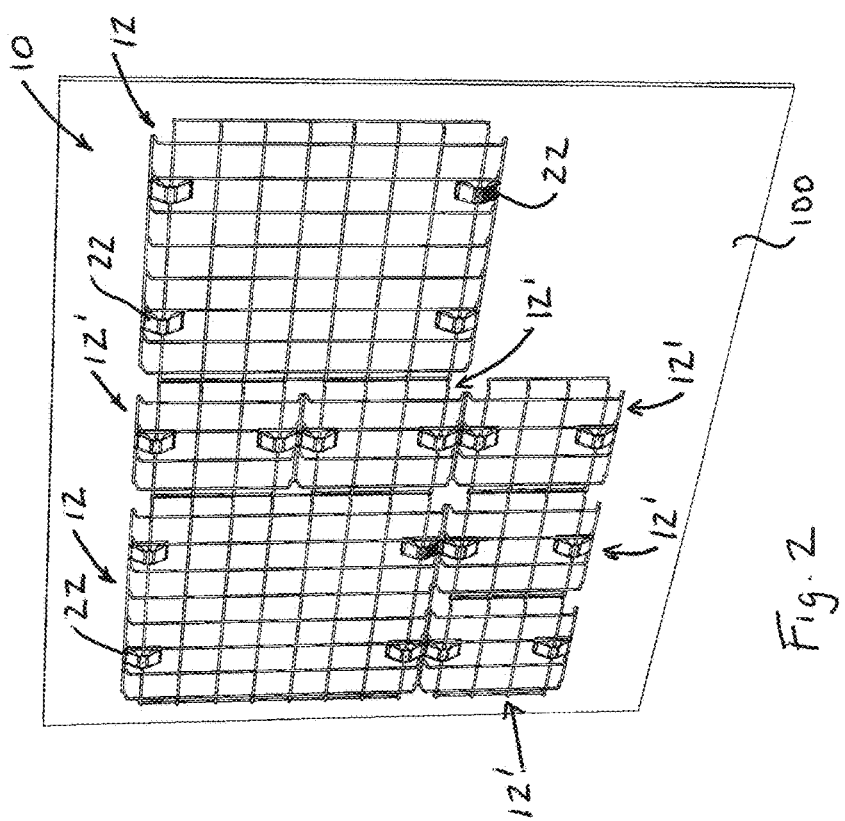

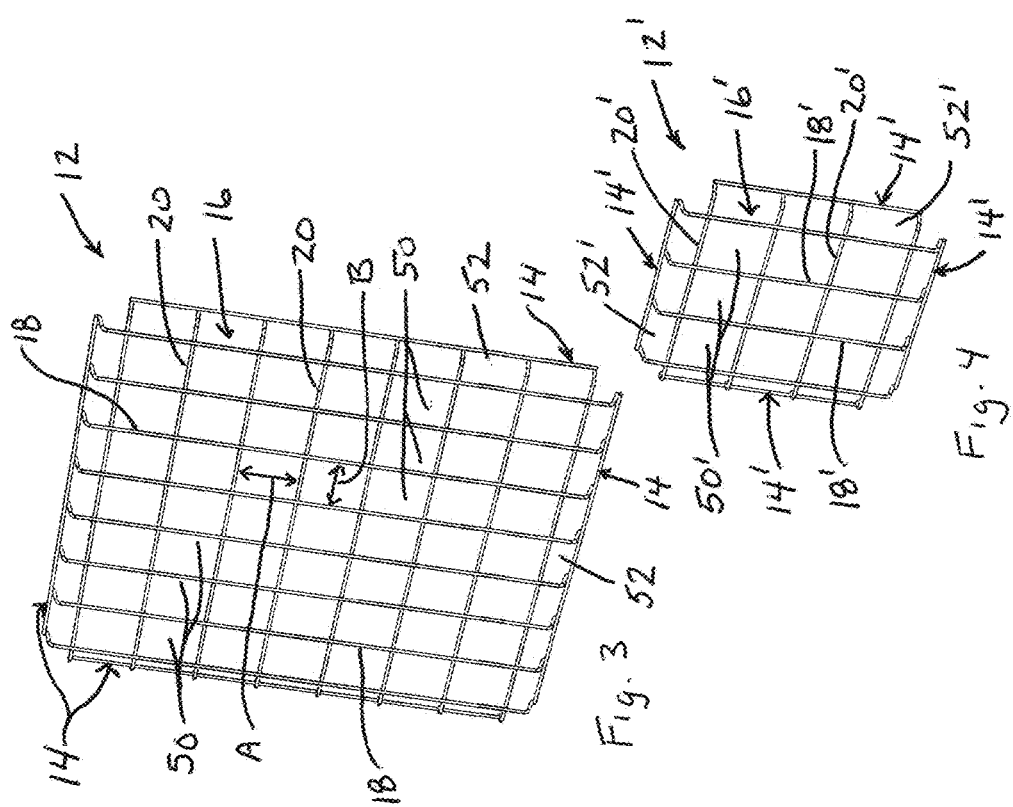

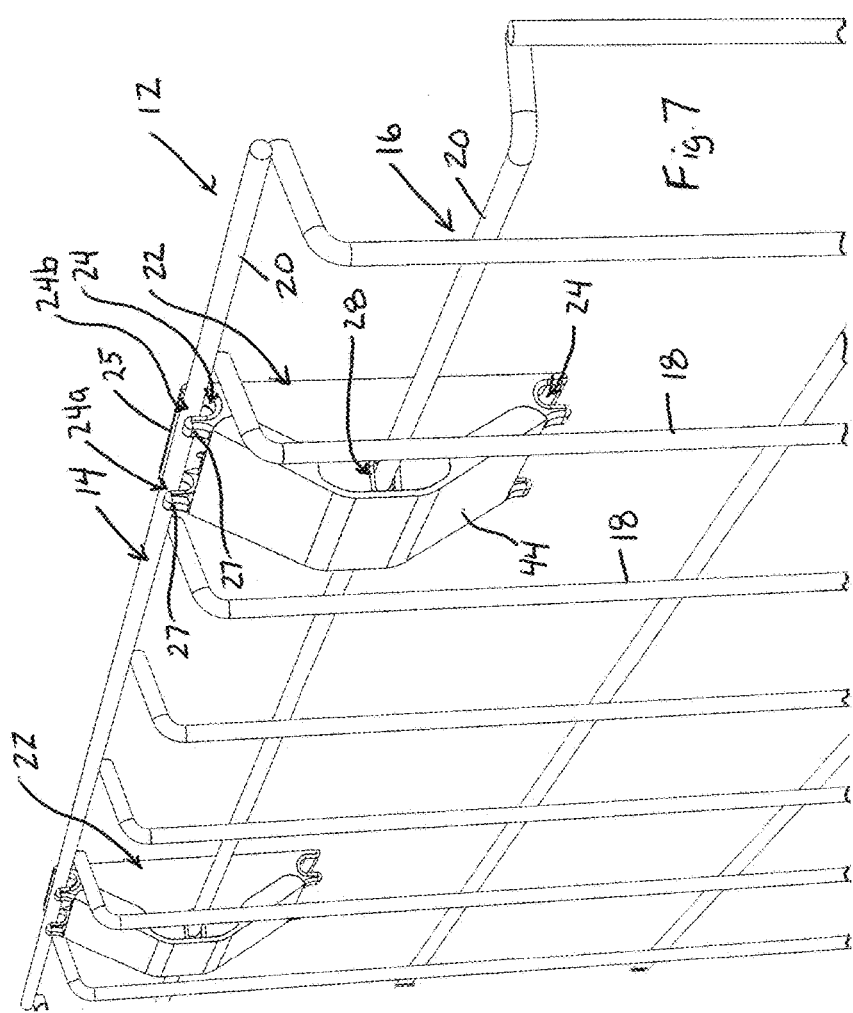

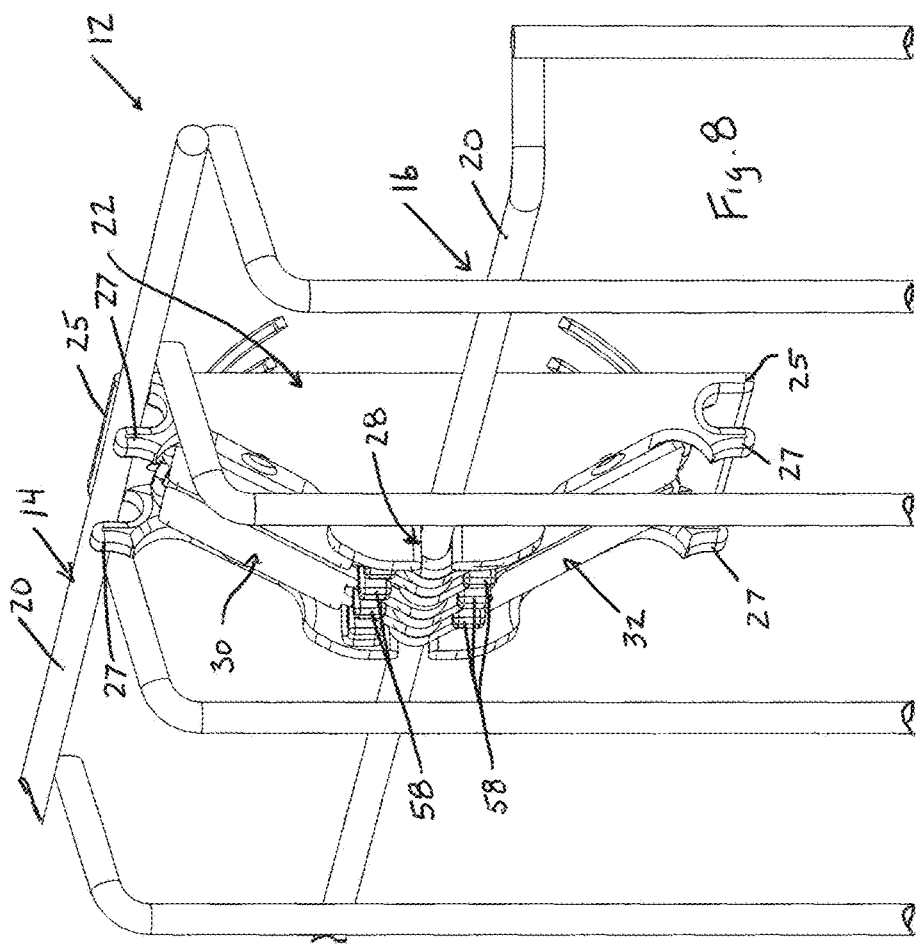

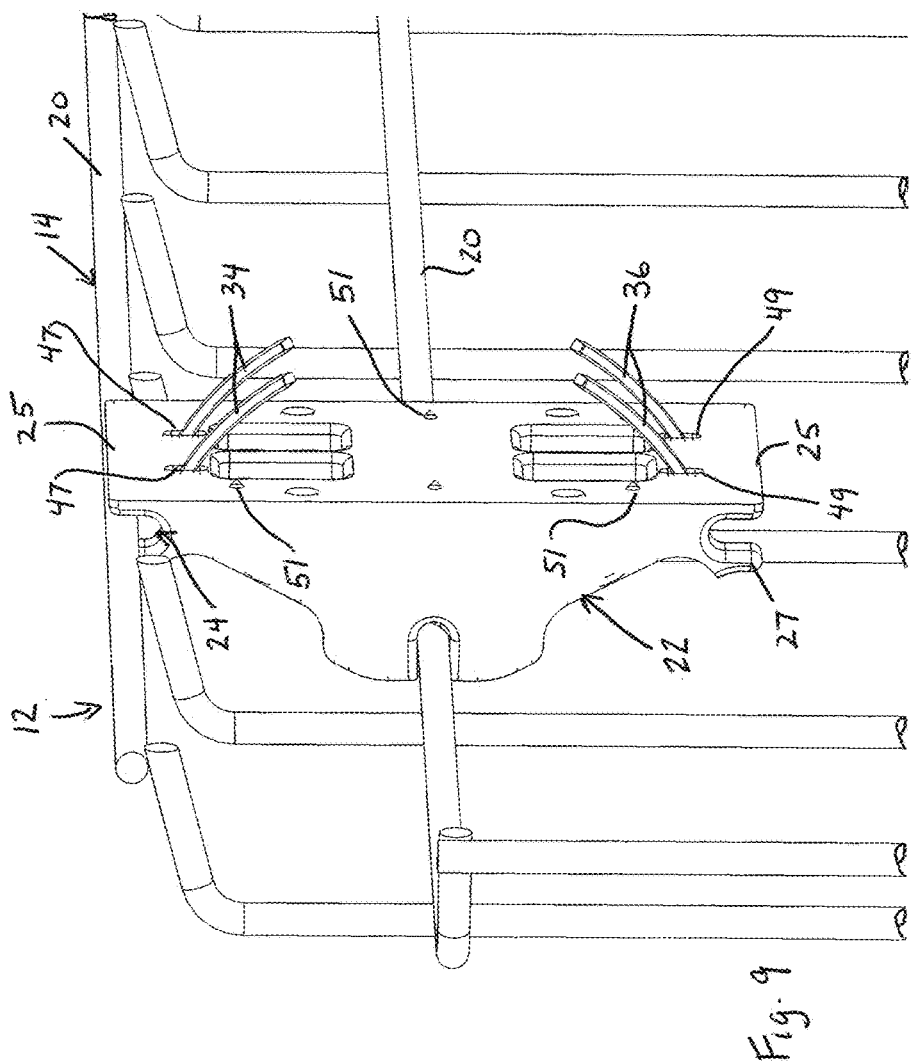

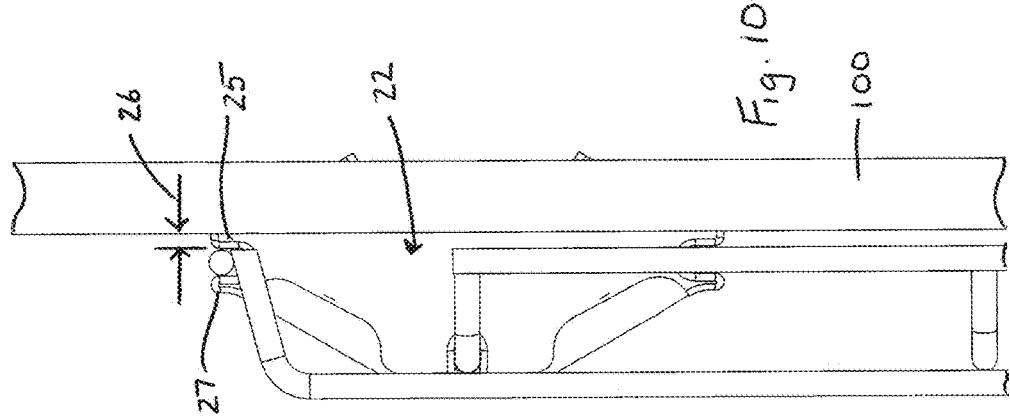

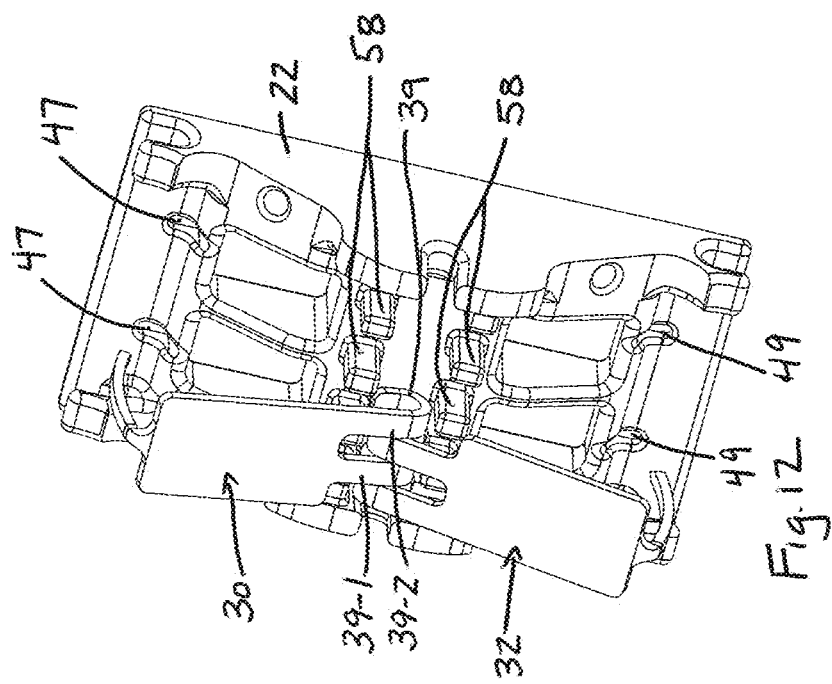
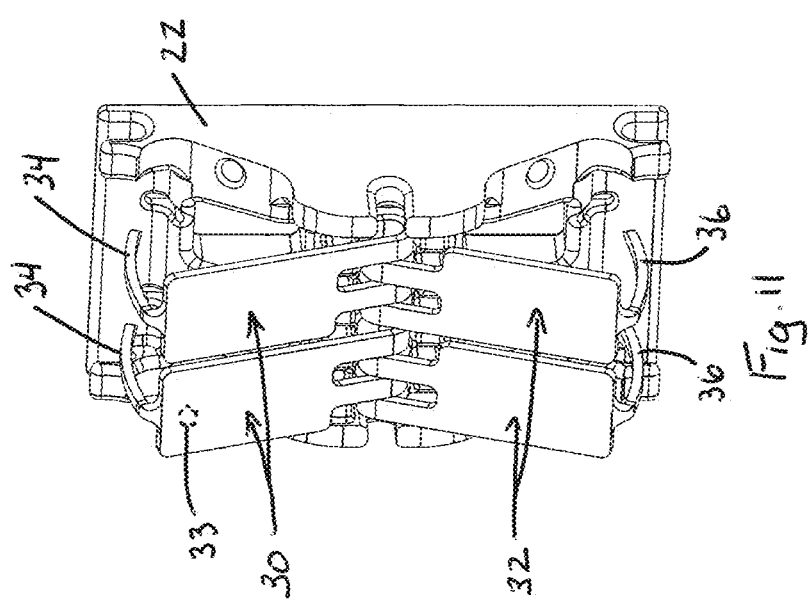

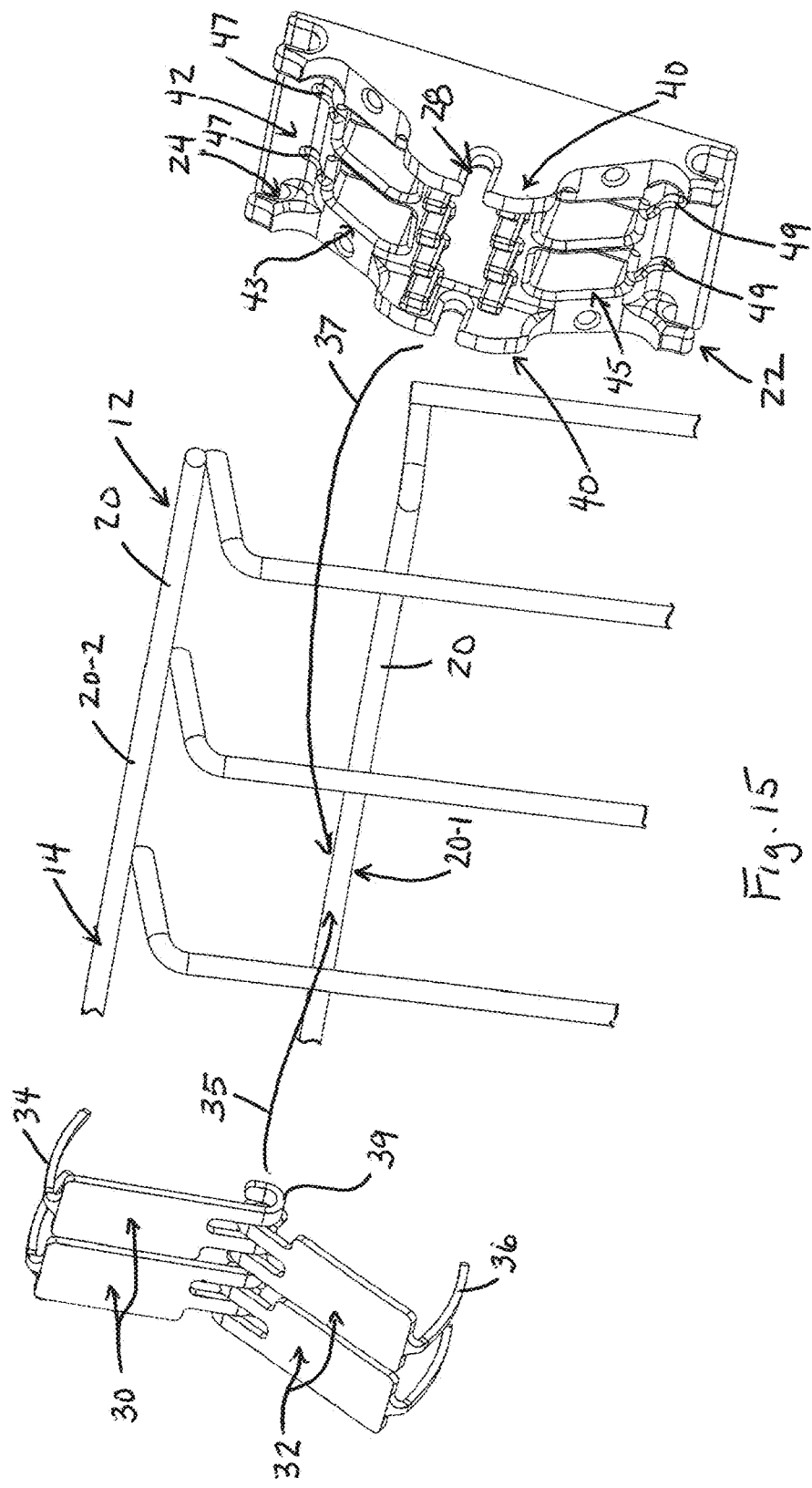

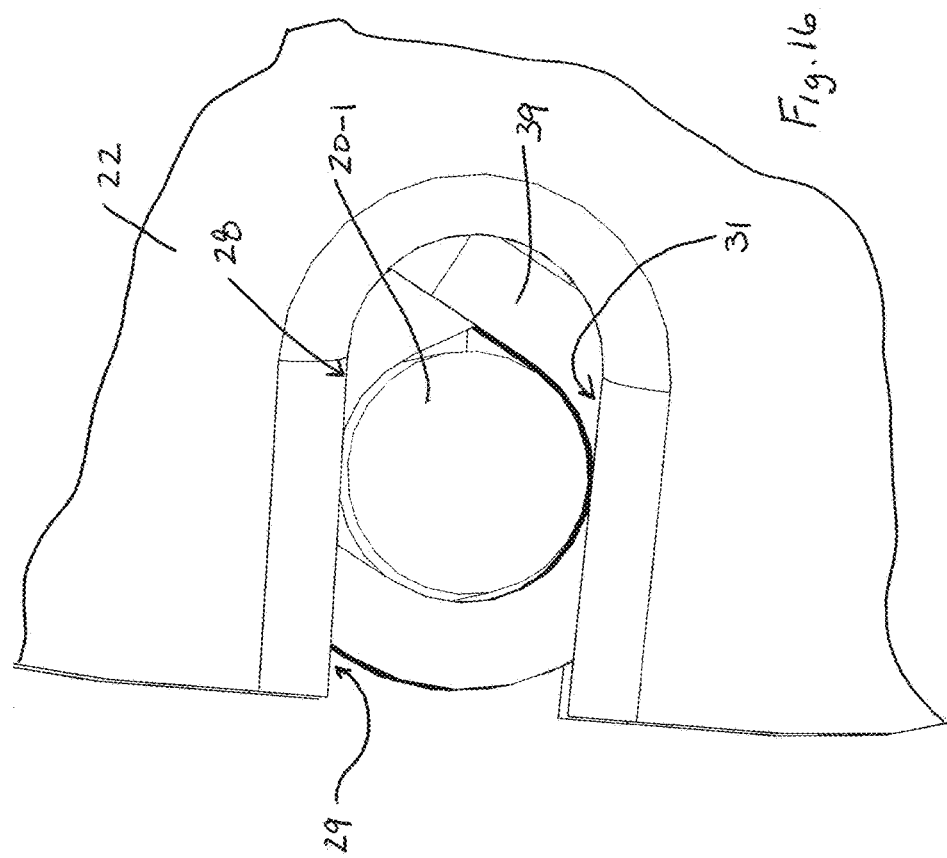

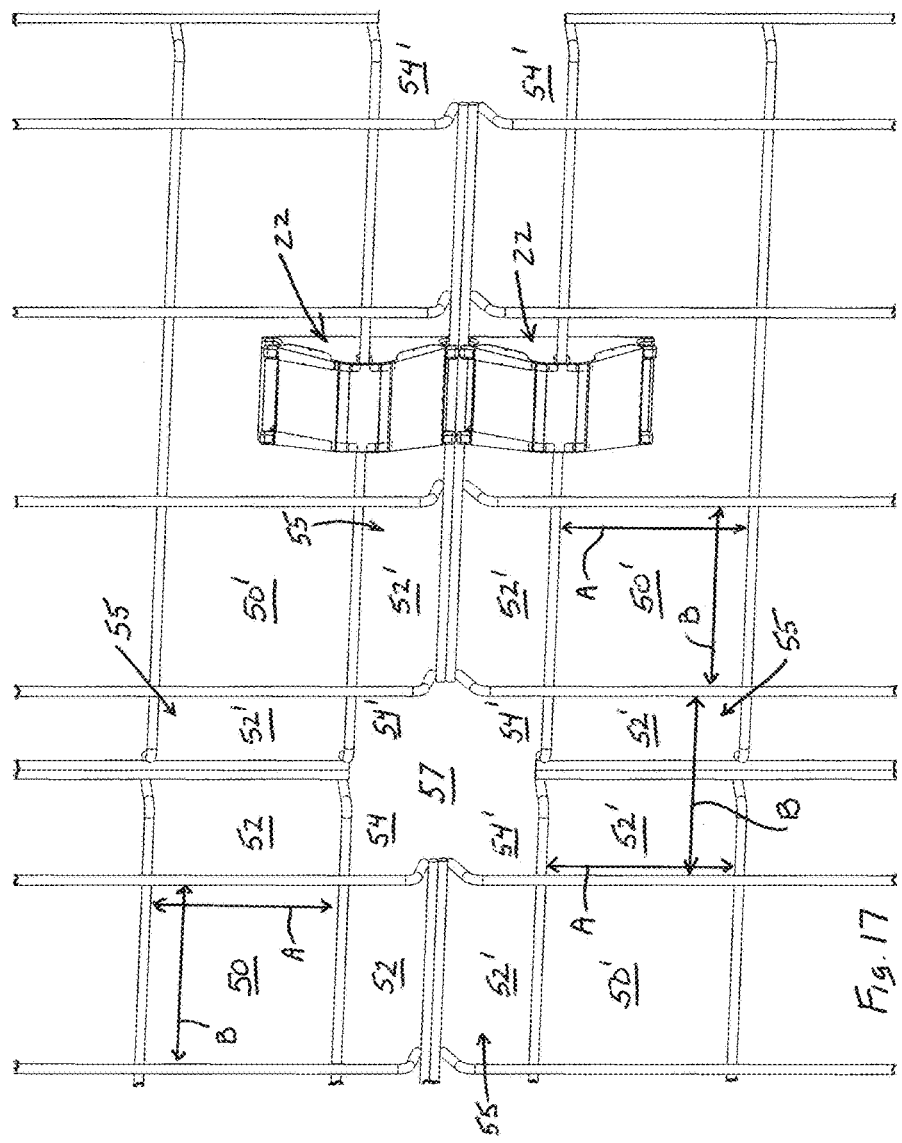

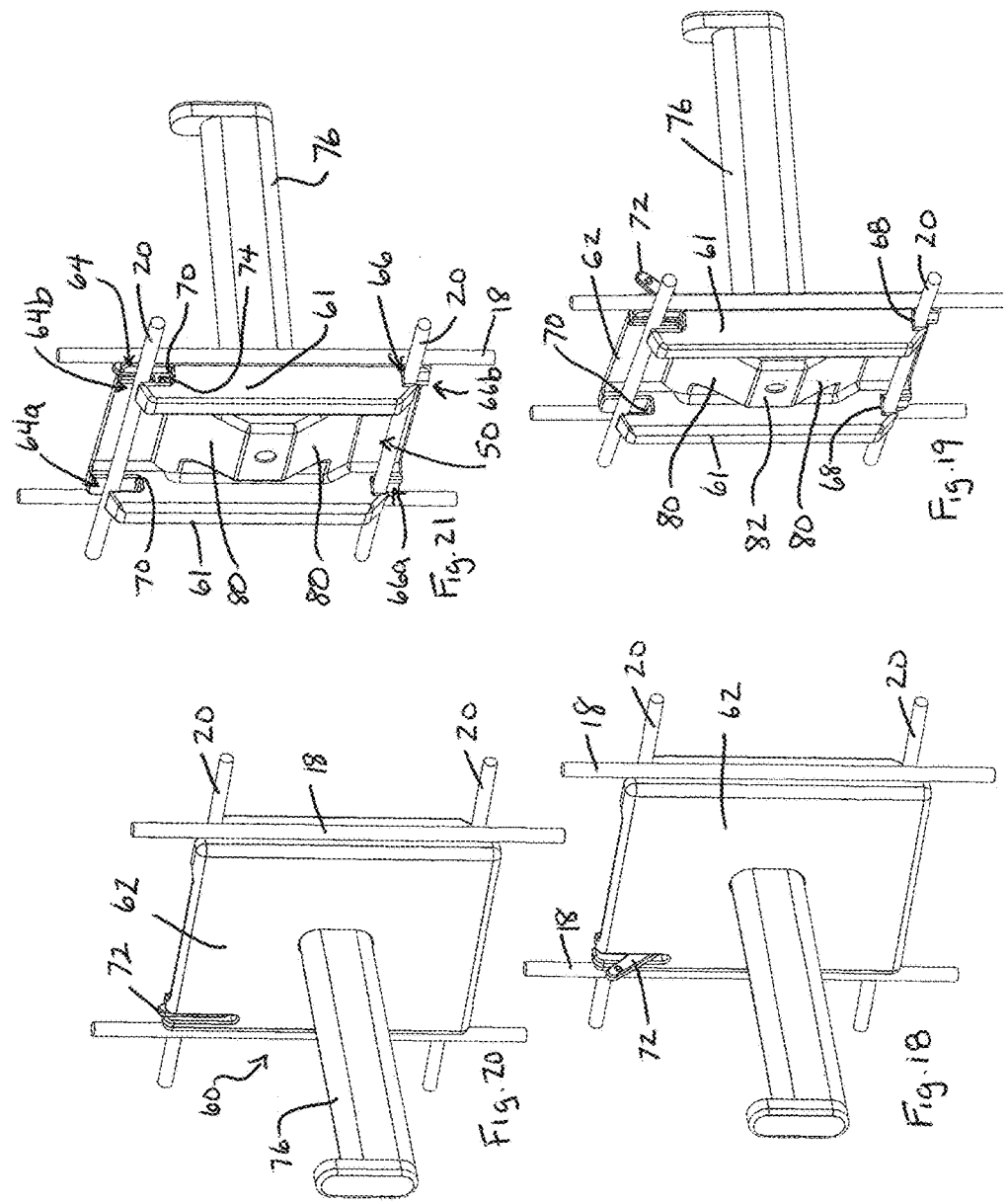

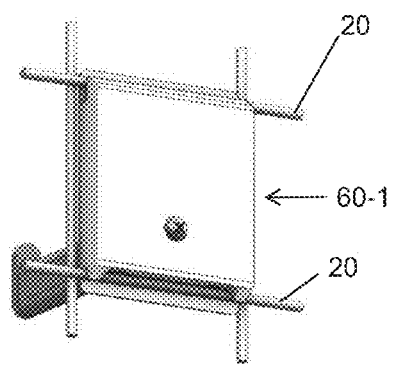
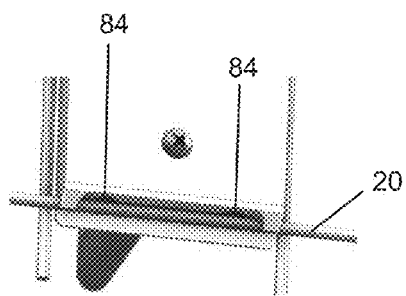
Fig. 27　　　　　　　　Fig. 28
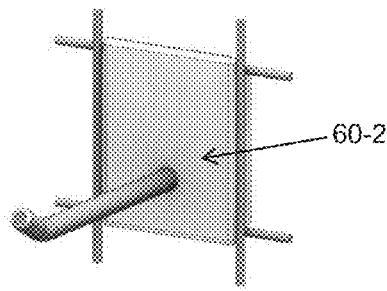
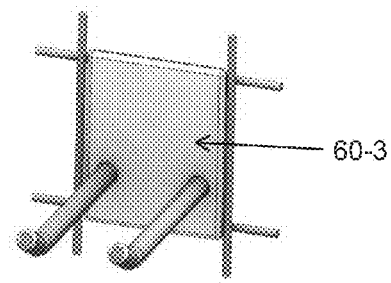
Fig. 29　　　　　　　　Fig. 30

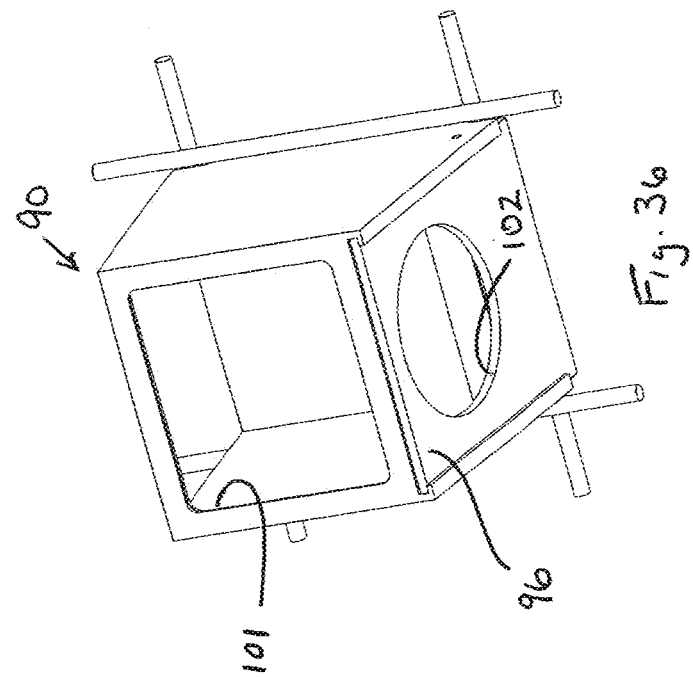
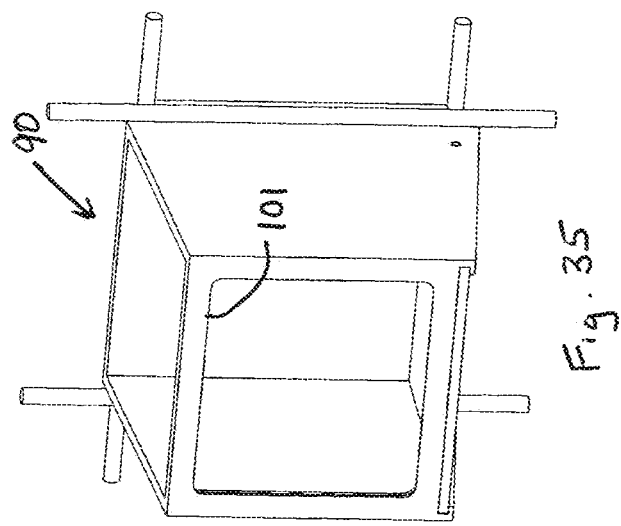

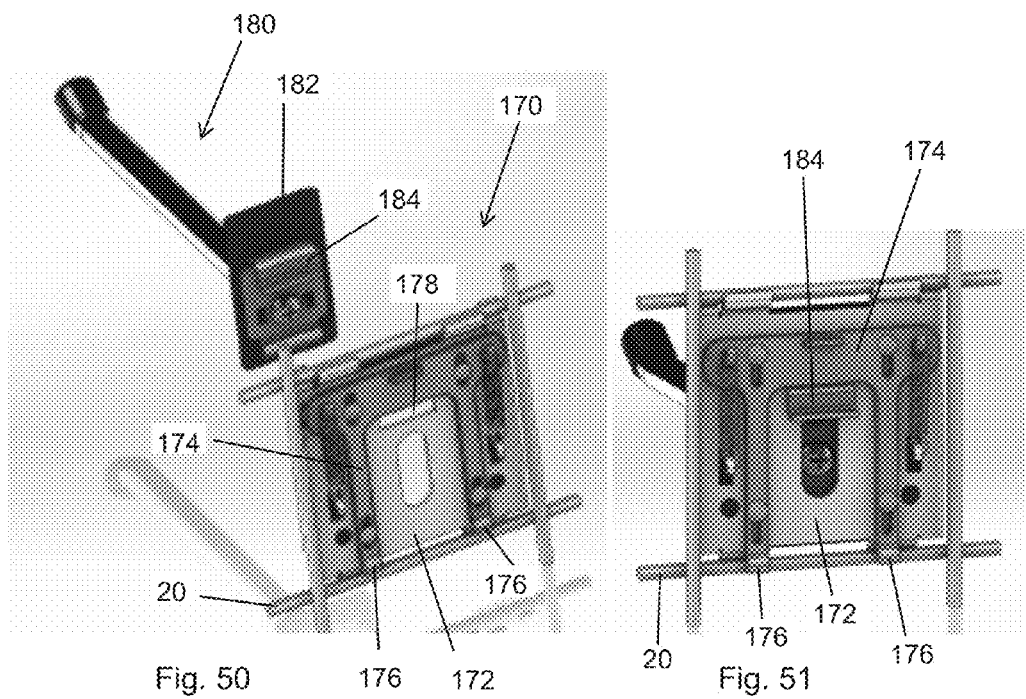

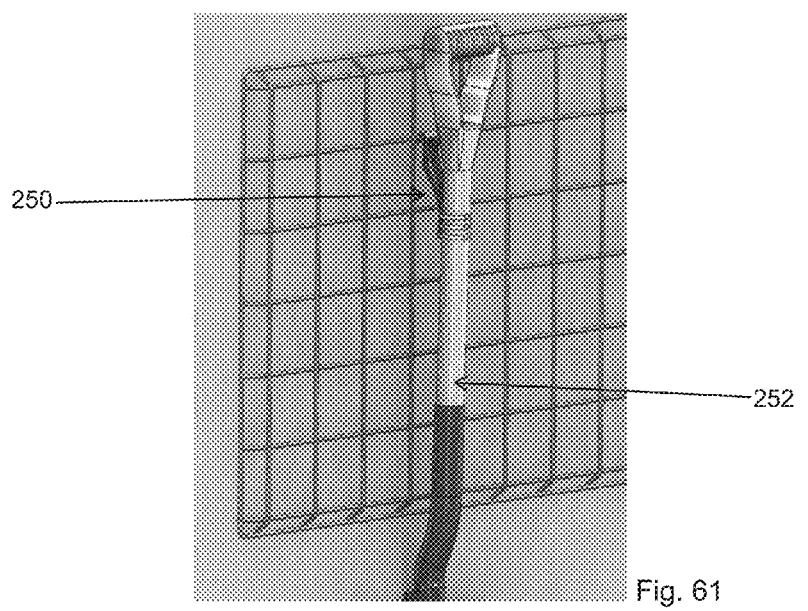
Fig. 61
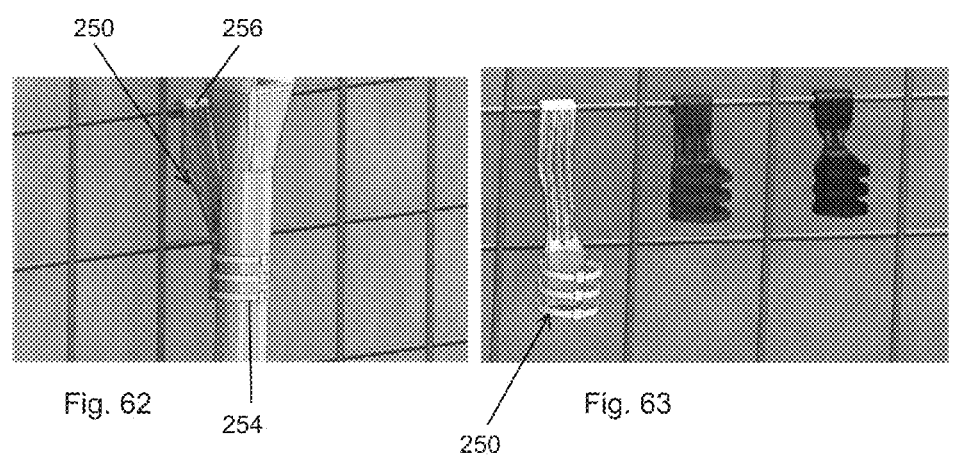
Fig. 62
Fig. 63

WALL MOUNTABLE OBJECT SUPPORT SYSTEM AND RELATED ACCESSORIES

TECHNICAL FIELD

This application relates generally to equipment and tool storage and organization and, more specifically, to wall-mounted systems and components for supporting items on a wall.

BACKGROUND

Storage systems such as rack systems utilized in garages or other storage spaces are well known. A variety of wall-mounted systems are commercially available. However, such systems require the use of tools to install and can be particularly difficult for one person to install. Moreover, many systems do not provide a suitable degree of modularity and flexibility.

It would be desirable to provide a storage system that can be installed without tools, can be installed by a single person and that provides a modular ability that facilitates a variety of configurations.

SUMMARY

In one aspect, a wall mounted object support system includes a grid member with a peripheral portion proximate a wall and a body portion offset from the peripheral portion and spaced further away from the wall than the peripheral portion. The grid member is formed by a plurality of spaced apart first elongated rod or wire portions each running in a first direction and a plurality of spaced apart second rod or wire portions each running in a second direction that is substantially perpendicular to the first direction. One or more of a support block and/or pivoting anchor components may be used to hold the grid member against the wall.

In another aspect, a wall mountable storage system includes a first grid member and a second grid member. The first grid member includes a first plurality of elongated rod or wire portions arranged to form a first plurality of rectangular mount zones in a first array, each rectangular mount zone of the first array having a height dimension A and a lateral dimension B. The second grid member includes a second plurality of elongated rod or wire portions arranged to form a second plurality of rectangular mount zones in a second array, each rectangular mount zone of the second array having a height dimension A and a lateral dimension B. A peripheral portion of the first grid member includes multiple partial mount zones, and a peripheral portion of the second grid member includes multiple partial mount zones. When the second grid member is arranged peripherally adjacent to the first grid member with a given one partial mount zones of the second grid member adjacent to and in alignment with a given one of the partial mount zones of the first grid member, the adjacent and aligned partial mount zones form a rectangular mount zone with a height dimension A and a lateral dimension B.

In a further aspect, a wall mounted object support system includes a first grid member and a second grid member. The first grid member is mounted on a wall and including a peripheral portion proximate the wall and a body portion offset from the peripheral portion and spaced further away from the wall than the peripheral portion, the first grid member formed by a plurality of intersecting elongated members that form a first array of mount zones. The second grid member is mounted on the wall and including a peripheral portion proximate the wall and a body portion offset from the peripheral portion and spaced further away from the wall than the peripheral portion, the second grid member formed by a plurality of intersecting elongated members that form a second array of mount zones. The second grid member is mounted with a first side adjacent a first side of the first grid member such that a third plurality of mount zones are formed by the combination of the first side of the first grid member and the first side of the second grid member.

In yet another aspect, a support apparatus is formed as a mount accessory for mounting on a grid member having multiple rectangular mount zones. The support apparatus includes a mount panel configured to retainably engage within any one of a plurality of the rectangular mount zones so as to be selectively retainable within any one of the plurality of rectangular mount zones. In certain implementations the support apparatus includes at least one of (i) a support hook or support arm protruding forward from the mount panel, (ii) a wedge mount bracket protruding forward from the mount panel, (iii) a basket structure or bin structure or shelf structure protruding forward from the mount panel or (iv) a power outlet component or lighting component facing forward from the mount panel.

As seen in the attached drawings, the system includes multiple advantageous features, such as not requiring any tools for mounting on sheet rock, easy installation by one person, very strong mounting on the wall without the need to hit studs, protecting the wall from scrapes and cuts, easily removable and adjustable with minimal scarring of the wall surface, avoiding blocking of electrical receptacles or switches, manufacturability in various sizes and colors, and/or useful for hanging any of garden tools, hand tools, lawn equipment, sport equipment, part bins, shelves, toys or other items.

BRIEF DESCRIPTION OF THE DRAWINGS

FIG. 1 shows a front elevation of a wall mounted object support system utilizing grid members;

FIG. 2 shows a perspective view of the system of FIG. 1;

FIGS. 3 and 4 show perspective views of grid members utilized in the system of FIG. 1;

FIGS. 7-9 show partial perspectives of a portion of the system of FIG. 1;

FIG. 10 shows a side elevation of an upper portion of the system of FIG. 1;

FIGS. 11-15 show one embodiment of a support block and anchor component arrangement useful for supporting grid members;

FIG. 16 shows an enlarged partial side elevation of a support block slot engaged with a segment of a grid member;

FIG. 17 shows a partial perspective of a portion of the system of FIG. 1;

FIGS. 18-21 show one embodiment of a mount accessory useable in connection with grid members;

FIGS. 27 and 28 show another embodiment of a mount accessory;

FIG. 29 shows another embodiment of a mount accessory;

FIG. 30 shows another embodiment of a mount accessory;

FIGS. 31-36 show another embodiment of a mount accessory;

FIGS. 50-51 show another embodiment of a mount accessory;

FIGS. 61-63 show another embodiment of a tool hanger.

Figure 5:
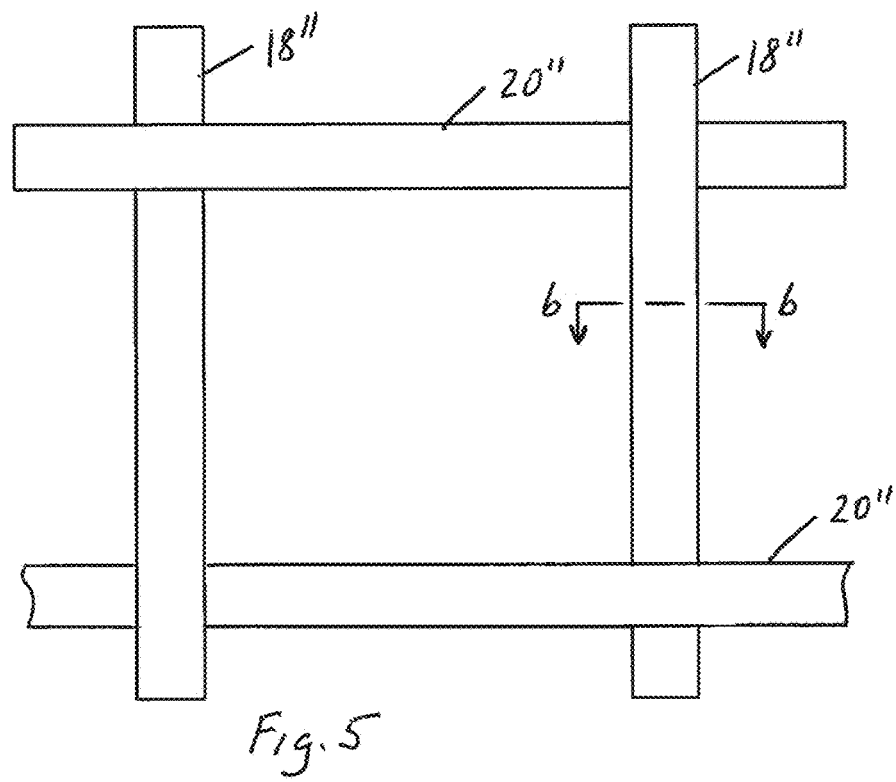
FIGS. 5 and 6 show an alternative grid member configuration.

The details of one or more embodiments are set forth in the accompanying drawings and the description below. Other features, objects and advantages will be apparent from the description and drawings, and from the claims.

DETAILED DESCRIPTION

Referring to FIGS. 1-17, a wall mountable object support system 10 mounted on a wall 100 is shown and includes multiple grid members 12, 12'. In the illustrated embodiment, as best seen in FIGS. 3 and 4, each grid member 12, 12' has a peripheral portion 14, 14' for positioning proximate the wall 100 upon install, and a body portion 16, 16' offset from the peripheral portion so as to be spaced away from the wall 100 upon install. Each grid member 12, 12' is formed by a plurality of spaced apart elongated rod or wire portions 18, 18' each running in a first direction (e.g., vertical) and a plurality of spaced apart rod or wire portions 20, 20' each running in a second direction (e.g., horizontal) that is substantially perpendicular to the first direction. The install configuration of the system 10 depicted in FIGS. 1 and 2 incorporates seven grid members in two different sizes, specifically two larger grid members 12 and five smaller grid members 12', but the system allows for numerous variations, including grid members of varying size and systems with different numbers and placement of the various size grid members, as will be appreciated from the description below.

Figure 6:
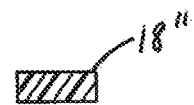

Regarding the spaced apart and intersecting rod or wire portions 18, 18' and 20, 20', it is contemplated that such elongated members will be of metal construction (e.g., wire or rod with a round profile), with or without a plastic or other protective or decorative coating. In such cases the grid members may be constructed by welding or other bonds at the intersection points of the elongated members. It is also recognized that other materials could be used, such as high strength composites or plastics, and that in some cases each grid member could be cast or molded as a unitary and monolithic unit. Moreover, as an alternative to round profile members, rectangular or other shape wire or rod members could be used. For example, FIGS. 5-6 depict use of "flatbar" profile (e.g., approximately 0.500" wide by 0.090", though other variations are possible) in which an over-under relationship between the elongated members 18" and 20" is used to achieve a woven appearance. As used herein, the terms wire and/or rod encompass all such variations in profile and size of the elongated members.

Referring again to FIGS. 1 and 2, one or more support blocks 22 (typically four or more) are used to mount each grid member 12, 12' to the wall 100. For purposes of the following discussion, where application of a support block 22 to one of the grid members 12 or 12' is described, it should be appreciated that the same holds true for the application of a support block 22 to the other one of the grid members 12 or 12'. As seen in FIGS. 7-10, each support block 22 may be connected to both the peripheral portion 14 and the body portion 16 of the grid member 12. In this regard, each opposed end of the support block 22 includes a respective slot 24 for permitting engagement with a wire or rod segment of the peripheral portion 14, with part of the slot defining structure disposed between the peripheral portion 14 and the wall to hold the peripheral portion in spaced relation (e.g., spacing 26) to the wall 100 as shown in FIG. 10. This spaced relationship can reduce damage to the wall on which the grid member 12 is mounted and is therefore advantageous. However, mount arrangements without such spacing are contemplated. In the illustrated embodiment, a continuous rear lip 25 and spaced apart fingers 27 together form the slots 24 as spaced apart slot segments 24a and 24b (FIG. 7), and the lip 25 is disposed between the peripheral portion 14 and the wall 100 upon install, but other variations are possible, such as continuous lip 25 being eliminated in favor of spaced apart fingers that align with fingers 27. The support block 22 also includes a centrally located slot 28 configured and located for engaging with a wire or rod segment 20 of the body portion 16, as will be more fully described below.

Figure 14:
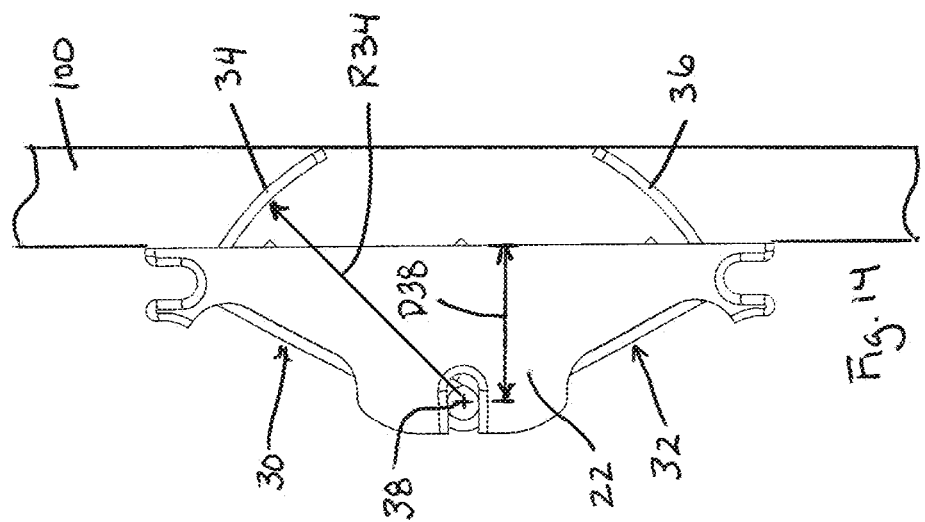
Figure 13:
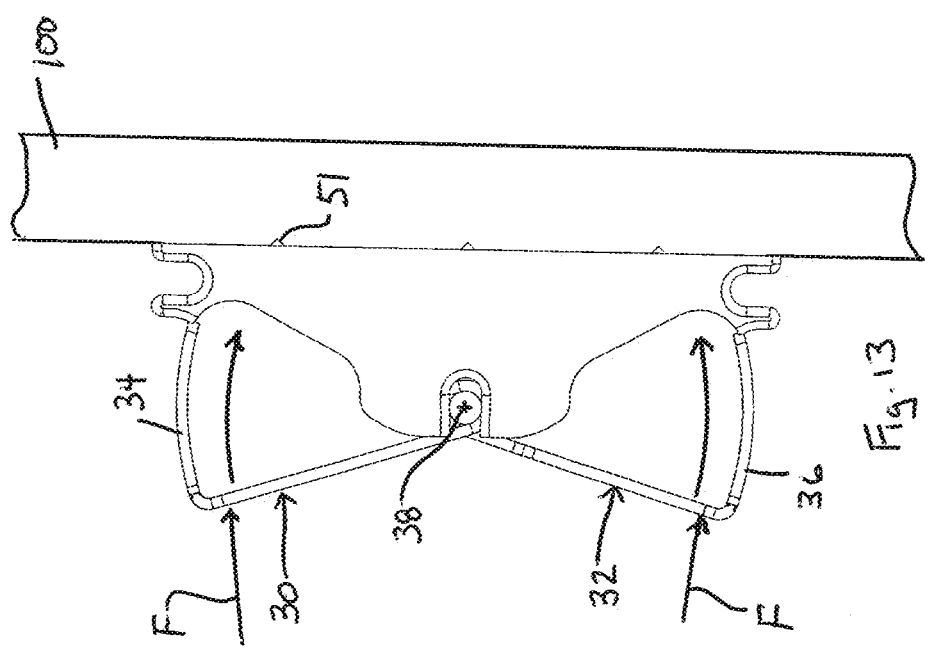

Each support block 22 includes a set of mounting anchor components 30, 32 pivotably associated with the mounting block 12. Each anchor component 30, 32 is pivotable for movement between a non-anchoring orientation relative to the wall (e.g., FIGS. 11 and 13) and an anchoring orientation (e.g., FIGS. 8, 9 and 14) in which one or more curved retainers 34, 36 of the anchor component is positioned to be inserted within the wall 100 to which the supporting block and grid member is mounted. Here, two upper anchor components 30 are provided, each with a single retainer 34, and two lower anchor components 32 are provided, each with a single retainer 36. As seen in FIG. 14, the anchor components 32, 34 are arranged and configured relative to the support block 22 such that when the anchor components are in respective anchoring orientations, the curved retainers 34, 36 oppose each other within the wall 100 to form a jaw-type gripping action of the wall. Notably, each anchor component 32, 34 has a pivot axis 38 (here a common pivot axis for all the components) that is offset from the wall contacting side of the support block 22, and thus the wall 100, by a distance D38 to facilitate the jaw-type grip and to provide an aggressive movement or progression of the retainers 34, 36 within the wall 100. For example, offset distances D38 of at least one-half inch, or more preferably at least three quarters of an inch, such as about one inch or more, are contemplated as particularly beneficial. Notably, the wall penetrating portion or extent of each retainer 34, 36 may be of arcuate configuration to facilitate install by manual rotation or pivot (e.g., applying a force F to the base plate of each anchor component via a user's thumb), where the center of the radius of curvature of each arcuate extent is substantially aligned with the pivot axis 38 per radius R34. With multiple anchor components utilized on each support block, the anchor components may be installed into the wall in a staged manner (e.g., one at a time). As suggested in FIG. 11, the front face of some or all of the anchor components could also include a seating feature 33, such as a through hole or detent, that would enable the tip of a screw driver to placed therein in order to apply force to the anchor components to rotated the anchor components into a wall.

As shown, each anchor component includes a loop portion (e.g., 39 in FIGS. 12 and 15) that engages directly with a segment of the wire or rod portion 20 of the grid member 12 to facilitate the pivot. In this regard, in terms of assembling the mounting arrangement of the anchor components and the support block on the grid member, reference is made to FIG. 15 showing an exploded view of the components. First, the anchor components 30, 32 are engaged with the segment 20-1 of the elongated wire or rod portion 20, as indicated by arrow 35. There may be a slight friction fit or detent engagement between the anchor component loops and the segment 20-1 to help retain the anchor components. As indicated by arrow 37, the support block 22 is then moved into engagement with the grid member from the back side of the grid member 12, with the upper slot 24 of the support block first being engaged with wire segment 20-2 of the peripheral portion 14 of the grid member so that central slot 28 of the support block aligns with and can be engaged onto the wire segment 20-1, thereby trapping the anchor components 30, 32 onto the wire segment 20-1. In this regard, as seen in FIG. 16, the slot 28 may be configured for removable retention on the wire segment 20-1, such as by the slot having an entry throat portion 29 that is slightly narrower in dimension than the diameter of the wire segment 20-1 and a base portion 31 that is slightly wider than the diameter of the wire segment 20-1, such that the wire segment effectively snap-fits into the base of the slot 28 by being forced past the narrow throat portion 29. Here the narrow throat portion 29 is achieved by the walls of the slot 28 tapering toward each other when moving toward the entry edge of the slot, but the narrow throat portion could be achieved by other means, such as one or more detents on the walls of the slot 28.

As seen in FIG. 15, the laterally central structure 42 of the support block 22 is recessed relative to side portions 40 so that the anchor components 30, 32 are captured between the block side portions 40 to help retain them against lateral movement along the wire or rod segment. The central structure 42 may also define seating surface portion(s) 43, 45 that define the final anchoring orientation of each anchor component (e.g., when the back side of the plate portion of the anchor component engages with the seating surface portions(s) 43, 45 of the support block). Openings 47, 49 towards the distal ends of the support block provide passages through which the retainers 34, 36 move to engage with the wall to which the support block and grid member will be mounted. The back side of the support block may also include one or more small, pointed protrusions 51 (FIG. 9) for engaging solidly into the surface of the wall for added stability. A set of forward protruding posts 58 act as stabilizing guides for the anchor components, where the posts 58 are positioned to pass through a slot formed by spaced apart legs (e.g., 39-1, 39-2 in FIG. 12) that form the loop 39 of each anchor component.

Once the desired set of support blocks and anchor components are engaged with a particular grid member, the grid member can be positioned at the desired location on a wall and then all of the anchor components (e.g., one by one) pressed into the wall such that the grid member is supported on the wall.

Notably, as suggested in FIGS. 1 and 2, the same support block configuration can be used at both the top and bottom of a grid member for the purpose of a wall installation of the grid member. Each support block may include a releasable cover 44 that extends over the central structure of the support block 22 so that the anchor components are disposed behind the releasable cover in a hidden manner (e.g., per FIG. 7). In such cases, the releasable cover 44 must be released (e.g., per FIG. 8) to enable each anchor component to be moved to its non-anchoring orientation. Such release may come by complete removal of the cover (e.g., where the cover is snap-fit to the support block) or such release may come by partial removal (e.g., where the cover is pivotably connected to the support block at one end and snap-fit at the other end). The use of the covers 44 also provides a more aesthetic overall appearance to the final installation.

Figure 22:
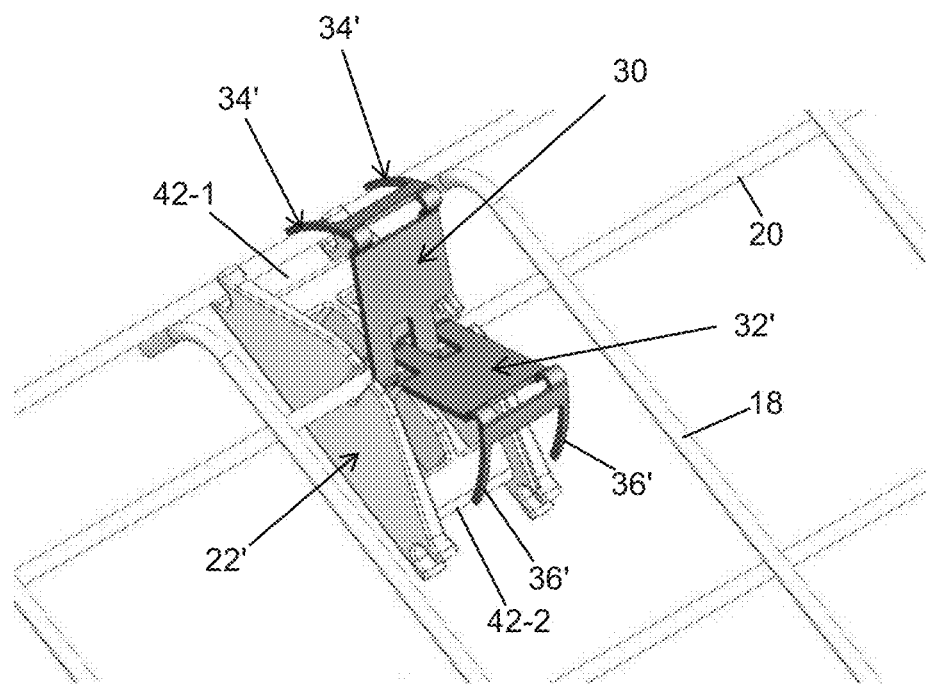
FIGS. 22 and 23 show another embodiment of a support block and anchor component arrangement useful for supporting grid members.
Figure 23:
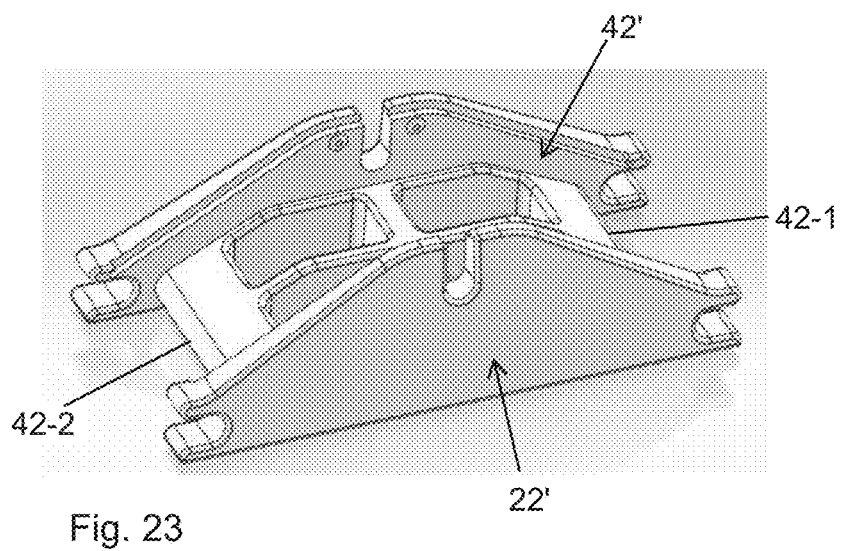

The support blocks 22 may, for example, be of separately molded plastic and then connected to the grid member 12 as described above, or in other cases may be over-molded directly onto the grid member. Other variations are possible. For example, in FIGS. 22 and 23 a support block 22' and anchor components 30', 32' are shown, where each anchor component 30', 32' includes two respective retainers 34', 36', and the a retainers are positioned to extend over and under respective end edges 42-1, 42-2 of the central portion 42' of the support block 22'.

As mentioned above, multiple grid members of the same or varying sizes may be used for a given wall mounted object support system, enabling the achievement of different system configurations that can be adapted according to given structure already existing on the wall (e.g., existing cabinets, counters, shelving, windows etc.). Notably, per FIGS. 3 and 4, the elongated rod or wire portions of each grid member are arranged to form rectangular mount zones 50, 50' on each grid member 12, 12', where the mount zones 50, 50' are arranged in an array. For system continuity, each rectangular mount zone 50, 50' of each grid member that is used may have the same size (e.g., a common height dimension A and lateral dimension B). Although square (A=B) mount zones are primarily contemplated, non-square (A≠B) mount zones are also possible. In other arrangements the rectangular mount zones formed in the grid members may also vary in size and number, though it is contemplated that in most systems defining a given installation the mount zones will all have substantially the same size. Moreover, in certain embodiments non-rectangular mount zones (e.g., triangular or trapezoidal) may be utilized.

As seen in FIG. 17, to further enhance system continuity, usability and scalability, the peripheral portion 14, 14' of each grid member may include multiple partial mount zones 52, 52'. When two grid member are arranged peripherally adjacent each other with respective partial mount zones 52 and/or 52' adjacent to and in alignment with each other, where each pair of combined partial mount zones of the two grid members forms a respective rectangular mount zone (e.g., 55) with the same height dimension A and a lateral dimension B as the mount zones 50, 50', increasing the overall number of usable mount zones rather than creating an unusable space between adjacent grid members. Moreover, the peripheral corner portions of each grid member 12, 12' also include partial mount zones 54, 54' sized and configured such that four grid members may be arranged proximate each other with four respective corner portions 54 and/or 54' adjacent and aligned such that the four adjacent and arrayed partial mount zones 54 and/or 54' together form a rectangular mount zone (e.g., 57) with the same height dimension A and a lateral dimension B.

As best seen in FIG. 1, each grid member 12' has a surface area size in front elevation view (e.g., height×width from periphery to periphery) that is one-quarter the surface area size in front elevation view of each grid member 12. Thus, a ratio of the surface area size in front plan view of the larger grid member 12 over the smaller grid member 12' results in a whole number. Maintaining such a ratio, in combination with common mount zone size and partial mount zone size, further enhances the ability to combine the various size grid members in a manner that assures that no space is wasted (e.g., as long as the grid members are probably positioned next to each other, full mount zones can be provided at all locations of adjacency).

The rectangular mount zones 50, 50', 55, 57 provide the ability for selective and variable mounting of accessories on the object support system at numerous locations. In this regard, and referring to FIGS. 18-21, in one embodiment an exemplary mount accessory 60 (shown mounted in a mount zone) includes a mount panel 62 configured to retainably engage within the rectangular mount zone so as to be selectively positionable within any one of the rectangular mount zones of a grid member or set of grid members. The illustrated mount panel 62 includes rearwardly extending side portions 61 that form an upper slot 64 for engaging with a segment of an upper wire or rod portion 20 and a lower slot 66 for engaging with a segment of a lower wire or rod portion 20. Here the slots 64 and 66 are formed by respective pairs of spaced apart slot segments 64a, 64b and 66a, 66b. The lower slot 66 includes an upper support surface 68 that rests on the lower wire or rod segment 20 when the mount panel 62 is retainably engaged within the rectangular mount zone, and the upper slot 64 includes a lower stop surface 70 that is spaced from the upper wire or rod segment when the mount panel 62 is retainably engaged within the rectangular mount zone.

One of the upper slot segments 64b includes a retention arm 72, which in this case moves between a non-retention position (FIGS. 18 and 19) and a retention position (FIGS. 20 and 21). Pivoting movement of the retention arm 72 moves a stop 74 into (FIG. 21) and out of (FIG. 19) the slot segment 24b. When the stop 74 is within the slot 24b, upward movement of the panel 62 is limited due to engagement of the wire or rod segment 20 with the stop 74, and thus the mount accessory 60 is retained within the mount zone against removal. Only when the stop 74 is moved out of the slot segment 24b can the mount panel 62 be moved upward enough for the lower slot 66 to clear its engaged wire segment 20, thereby enabling the lower end of the mount panel to be pivoted forward so that the mount panel 62 (and mount accessory) can be disengaged from the mount zone. Installation of the mount accessory 60 in a different mount zone involves the reverse operation. Embodiments without the retention arm 72 are possible and contemplated.

An elongated hook 76 (which may be a flattened bar-type connected to the mount panel 62 via a fastener, welding or other means) protrudes from the front of the mount accessory 60, but variations are possibly. The mount accessory may include any one of (i) a support hook or support arm protruding forward from the mount panel, (ii) a wedge mount bracket protruding forward from the mount panel, (iii) a basket structure or bin structure or shelf structure protruding forward from the mount panel, (iv) a power outlet component or lighting component facing forward from the mount panel or (v) some other structure at the front of the mount accessory.

Figure 24:
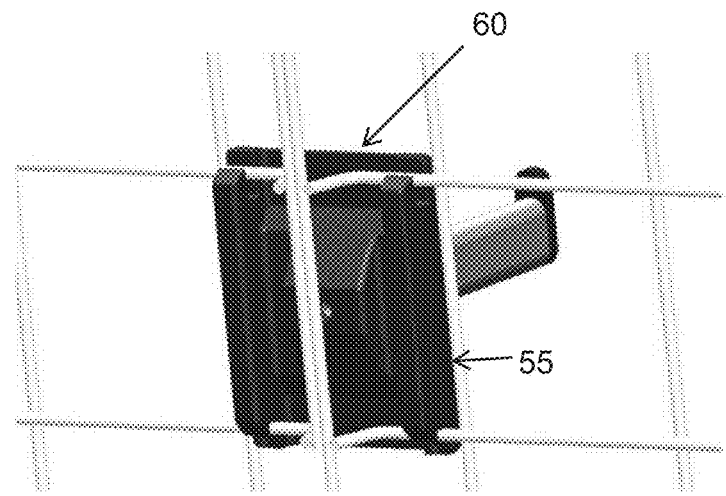
FIGS. 24-26 show alternative positions of a mount accessory in different mount zones of a support system.
Figure 25:
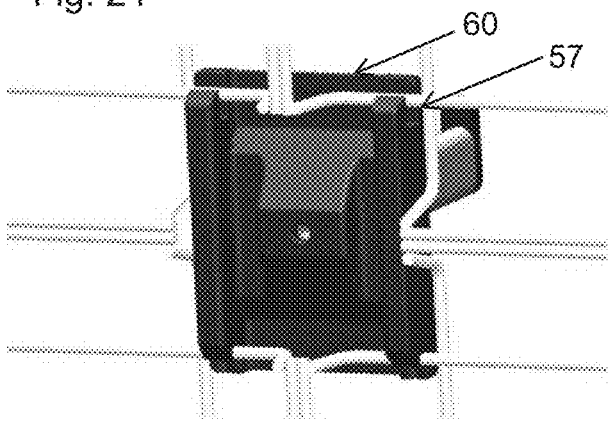
Figure 26:
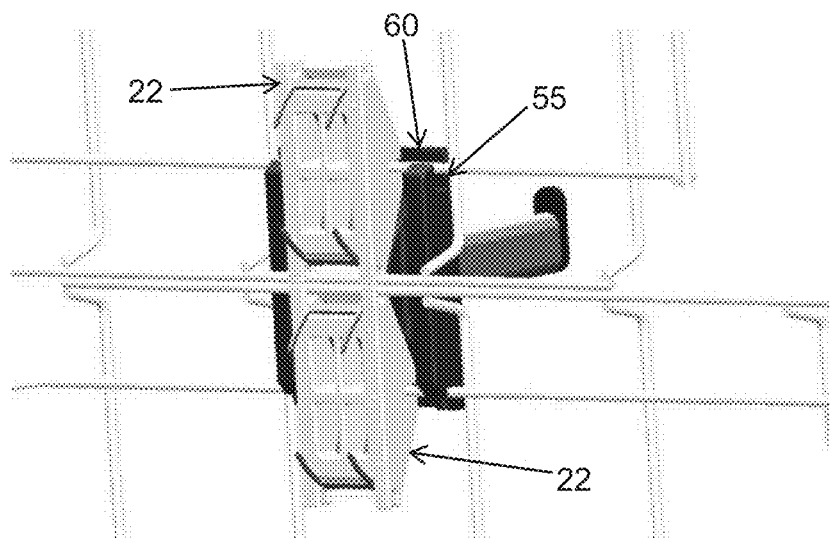
Figure 33:
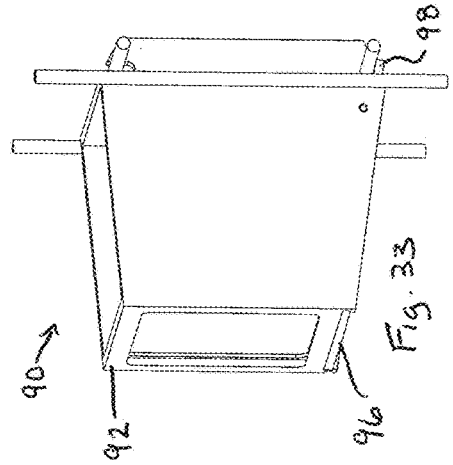
Figure 34:
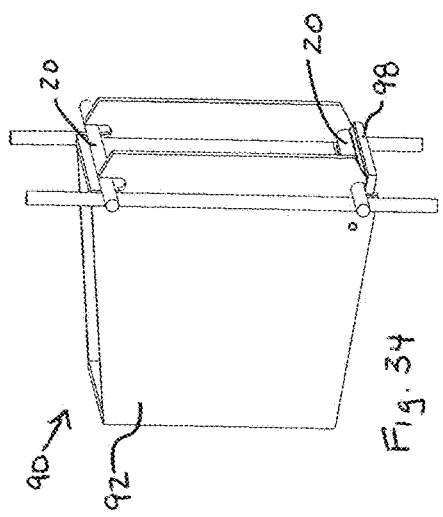
Figure 31:
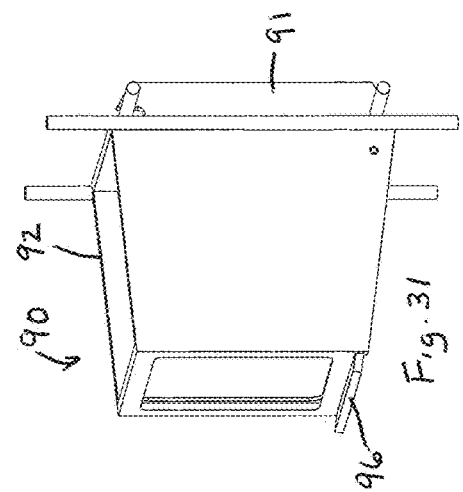
Figure 32:
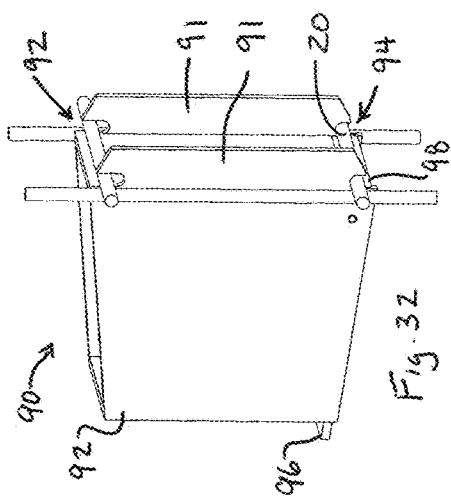

The back side of the mount panel is also recessed to enable the mount panel 62 to fit over all or part of a support block 22. The mount accessory 60 can be positioned within any of the mount zones 50, 50', 55 or 57, and regardless of whether the support blocks are located within such zones, as depicted in FIGS. 24-26. Notably, the back side of the mount accessory includes a tapered shape with surfaces 80 (FIGS. 19 and 21) angling toward each other when moving rearwardly and towards the vertical center of the accessory where a central planar surface 82 is located. The surface angle may substantially match the angle of the outer surfaces of the releasable cover on the support blocks.

Other configurations of mount accessories are contemplated. For example, FIGS. 27 and 28 show a mount accessory 60-1 in which the mount panel includes upper and lower slots for engagement with lateral wire segments 20 of a grid member, but without a movable retention arm. Instead, the lower slot includes a pair of spaced apart magnets 84 mounted therein that tend to retain the mount accessory downward by interaction with the metal of the lower wire segment 20 of the mount zone. FIG. 29 shows a mount accessory 60-2 with a rod style hook support, and FIG. 30 shows a mount accessory 60-3 with a pair of laterally spaced hook supports. Other variations are possible.

Referring to FIGS. 31-36, a mount accessory 90 in the form of a parts bin 92 is shown, where the rear wall panel of the parts bin includes laterally spaced apart rearwardly protruding portions 91 that form upper and lower slots 92, 94 (each formed by laterally spaced slot segments) for engagement with the grid member as described above. A bottom panel 96 acts as a latch or retaining mechanism that is movable between a non-retention position (FIGS. 31 and 32) used for installation and removal and a retention position (FIGS. 33 and 34) that operates to prevent the mount accessory from being lifted vertically in the manner that would permit removal from the grid. Here, the rear end 98 of the bottom panel 96 slides beneath the lower wire segment 20 of the mount zone for the retention purpose when in the retention position, but is movable forward and clear of the lower wire segment 20 for the purpose of install and removal operations. Other retention features could be provided, such as the magnets describe above.

The parts bins 92 is a five-walled box type structure with an open top, but other configurations are possible. Here, the front wall of the parts bin has a window opening 101. In some embodiments the window may be of clear plastic for observation of the items within the bin, while in other embodiments the window may be open to operate as an access to parts within the bin. Of course, embodiments with a solid front wall are also contemplated. The hole 102 in the bottom panel 96 facilitates gripping for manual operation of the slide feature (note that the bottom panel 96 is actually positioned beneath the solid bottom wall of the parts bin).

Figure 37:
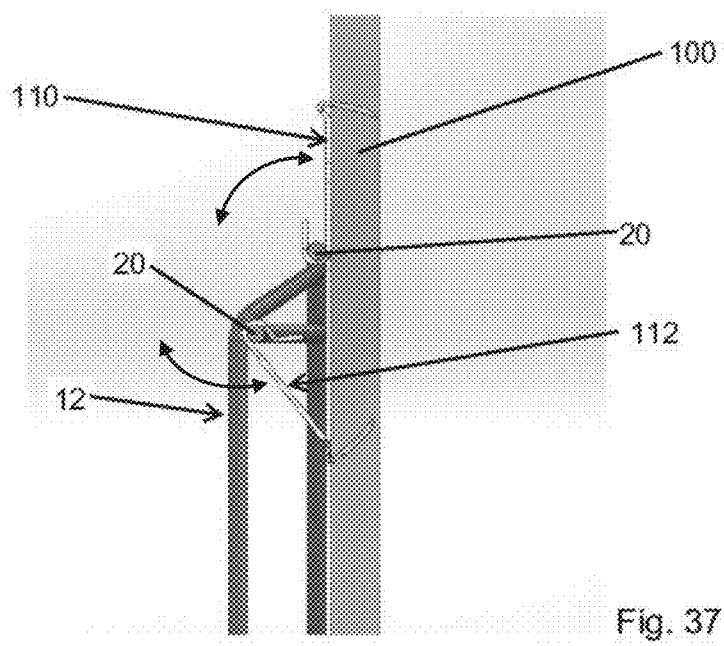
FIGS. 37 and 38 show another arrangement of anchor components mounting a grid member to a wall.
Figure 38:
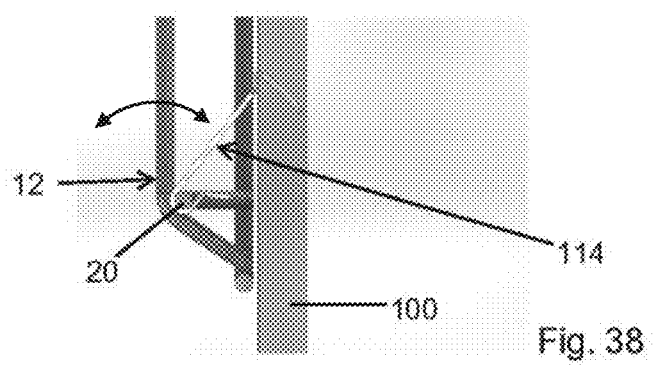
Figure 39:
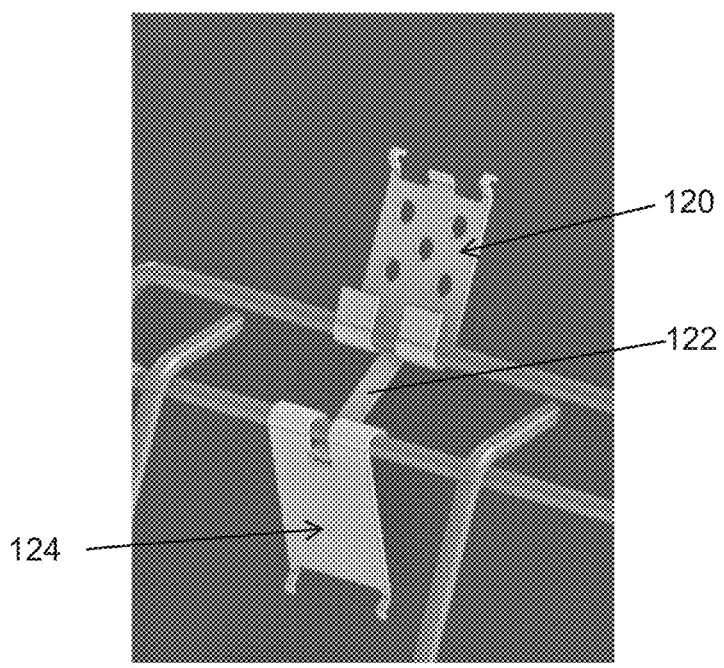
FIG. 39 shows another arrangement of anchor components on a grid member.
Figure 40:
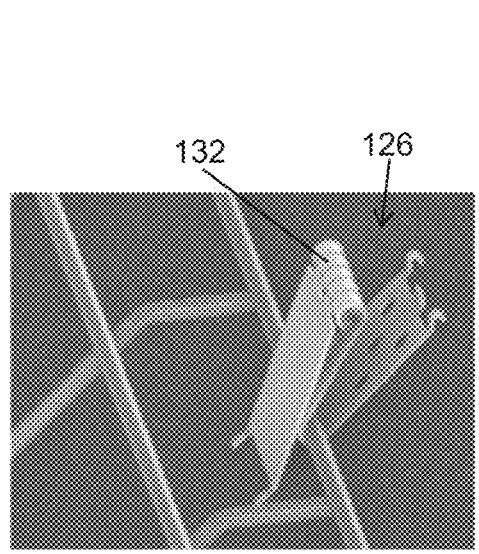
FIGS. 40-41 show another arrangement of anchor components on a grid member.
Figure 41:
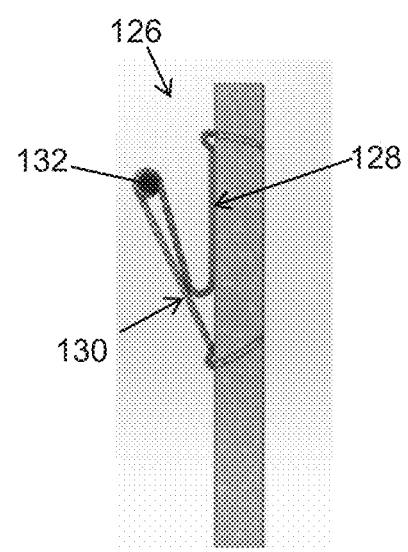

As mentioned above, variations are possible for the manner of mounting grid members to walls, including those that do not make use of support blocks. FIGS. 37 and 38 show a variation in which the upper portion of a grid member 12 includes one pivoting anchor component 110 with its loop end engaged with the wire segment 20 at the peripheral part 14 of the grid member, another pivoting anchor component 112 engaged with the wire segment 20 at the upper edge of the body portion of the grid member 20, and another pivoting anchor component 114 engaged with the wire segment 20 at the lower edge of the body portion of the grid member. In this arrangement, anchor component 110 (with its curved retainer curving downward in the wall) primarily supports vertical (shear) loading of the grid member, anchor component 112 (with its curved retainer curving upwardly within the wall) primarily supports rotational (cantilever)

loading of the grid member and anchor component 114 (with its curved retainer curving downwardly within the wall) supports both vertical (shear) and rotational (cantilever) loading of the grid member. FIG. 39 depicts an arrangement in which an upper anchor component 120 includes a downwardly and forwardly extending alignment tab 122 that seats within a slot of a lower anchor component 124. FIGS. 40 and 41 depict an anchor assembly 126 in which anchor components 128 and 130 are hingedly connected with each other via a hinge 132.

Figures 42, 43:
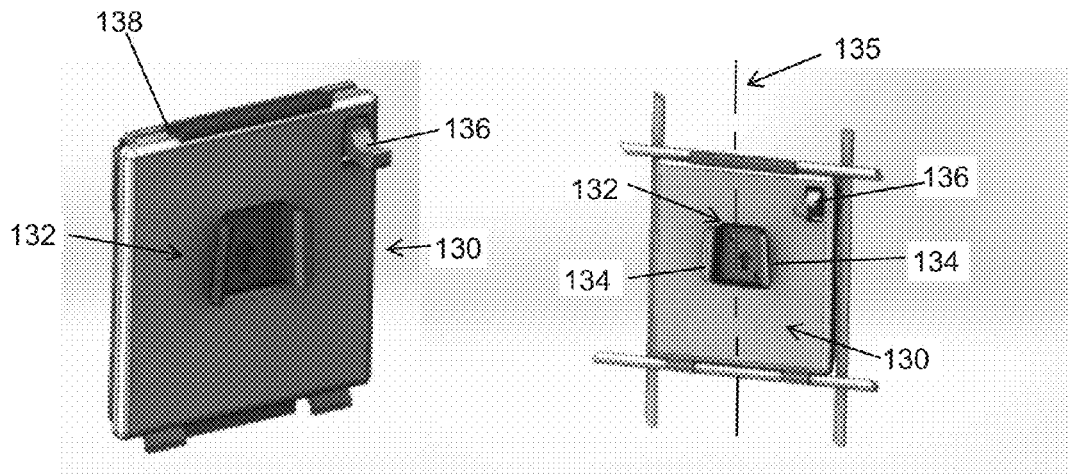
FIGS. 42-43 show another embodiment of a mount accessory.

FIGS. 42 and 43 show a mount panel structure 130 with a front side having a wedge bracket 132 thereon. The wedge bracket 132 includes left and right side flanges 134 that are offset from the front surface of the panel 132. The side flanges 134 are angled slightly rearward when moving in a vertically downward direction such that a spacing of the upper end of the flanges 134 to the front panel surface is greater than a spacing of the lower end of the flanges 134 to the front panel surface. The lateral edges of the side flanges 134 may also be slightly offset from vertical 135 (in this case the side edges converging toward each when moving vertically upward). The flanges 134 may be used to mount a separate member or component, such as a hook, parts bin, shelf or other structure onto the mount panel 130 with a wedging action as will be described below. The mount panel includes a latch lever 136 that moves a rear lip 138 downward for enabling removal the mount panel from a mount zone (e.g., via a forward pivot of the upper end of the mount panel). The lever 136 and lip 138 are biased upward into a retention position that prevents the forward pivot.

Figures 44, 45:
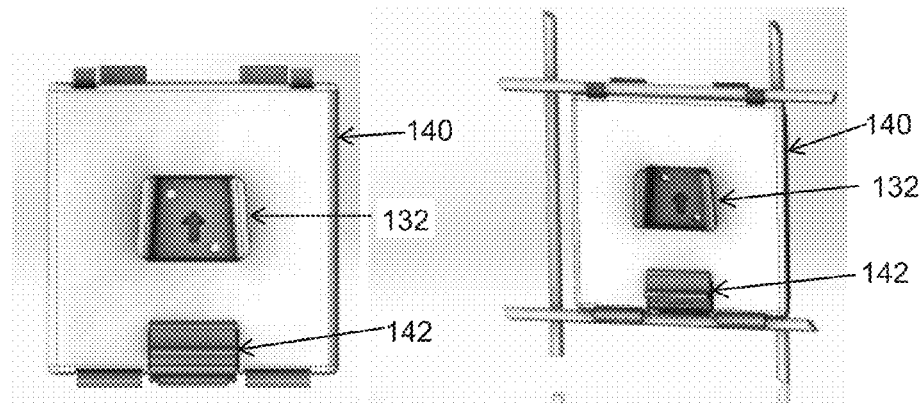
FIGS. 44-45 show another embodiment of a mount accessory.
Figure 46:
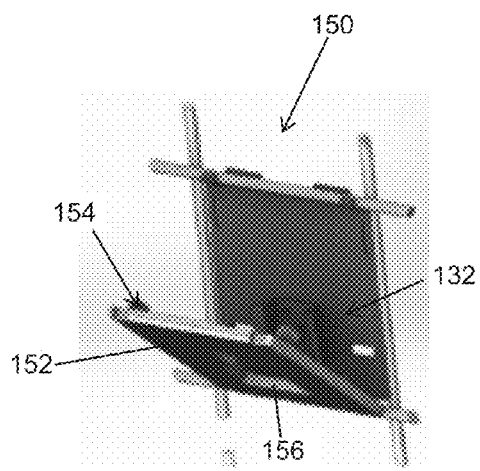
FIGS. 46-49 show another embodiment of a mount accessory.
Figure 47:
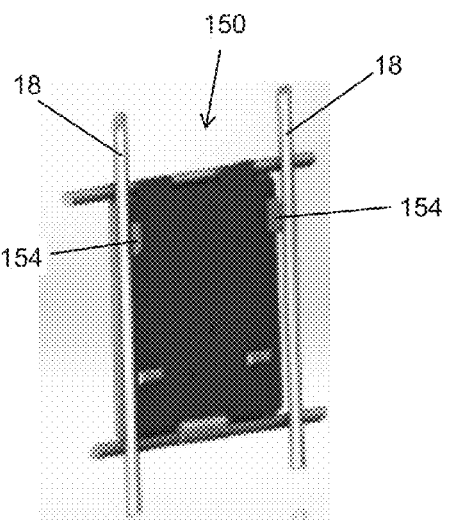

FIGS. 44 and 45 show another embodiment of a mount panel 140, with similar wedge bracket 132, but with the release lever 142 and lip at the bottom side of the mount panel. FIGS. 46 and 47 show another embodiment of a mount panel 150 in which a front cover 152 of the mount panel is hinged to rotate and includes side tabs 154 that interact with vertical wire segments 18 to retain the mount panel in a mount zone when the cover is in its closed/retention position. The side tabs 154 may flex or yield slightly for the purpose of pivot of the cover 152 between retention and non-retention positions. A wedge bracket 132 is mounted at the front of the rear portion of the mount panel 150 and passes through an opening 156 in the cover 152.

Figure 48:
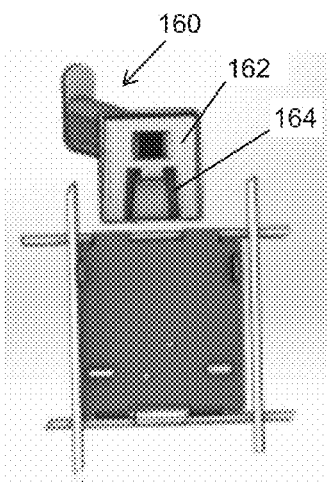
Figure 49:
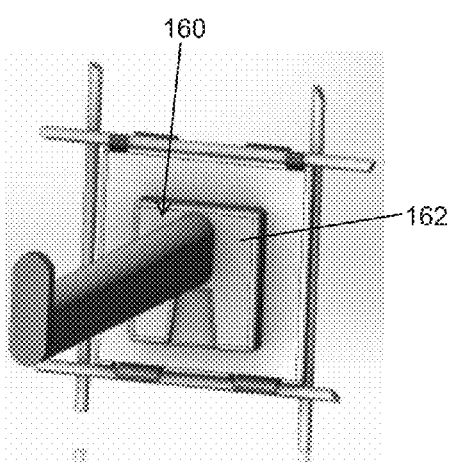

As seen in FIGS. 48 and 49, the wedge bracket 132 (of any of the foregoing embodiments 130, 140, 150) may be used for mounting a hook structure 160 where the rear side of a base portion 162 of the hook structure includes a mating bracket structure 164 that is configured to slidingly engage with the bracket 132. In particular, bracket structure 164 at the rear side of base 162 may include laterally spaced apart channels that are configured to align with and slide over the side flanges 134 in a manner that pulls the base 162 toward the front side of the mount panel to provide a wedging function. Further details regarding the sliding and wedging action are described in detail in in U.S. Patent Publication No. 20170000270, which is incorporated herein by reference.

FIGS. 50 and 51 show an embodiment of a mount accessory 170 in which the back side of a mount panel 172 includes a slidable retention plate 174 that is spring-biased downward to place retention fingers 176 behind the lower wire segment 20 of a mount zone. Lifting the plate 174 upward (e.g., via access through opening 178) enables removal of the mount accessory from the grid member. A hook member 180 includes a base 182 with a mount bracket 184 at its rear side that fits within the opening 178 for mounting to the panel 172.

Figure 52:
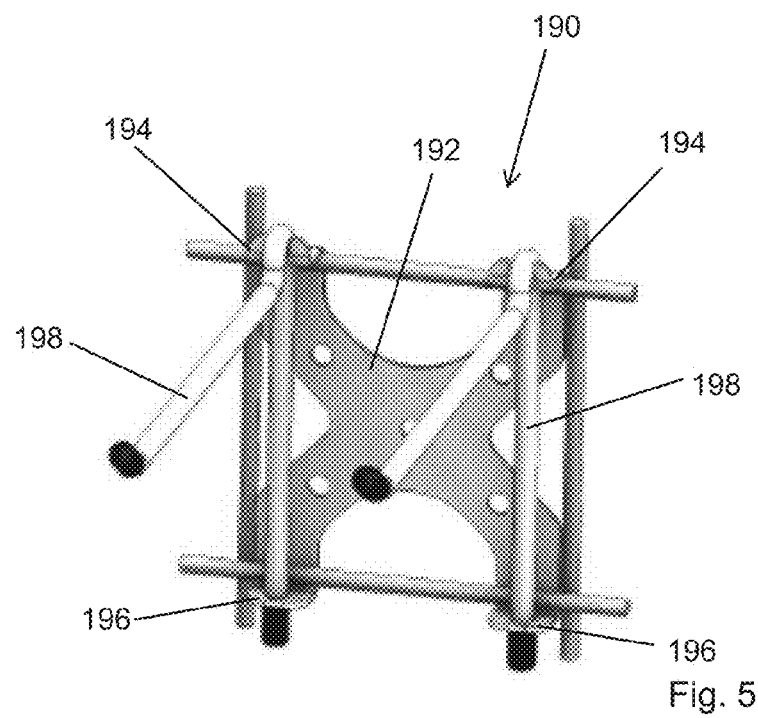
FIGS. 52-54 show another embodiment of a mount accessory.
Figures 53, 54:
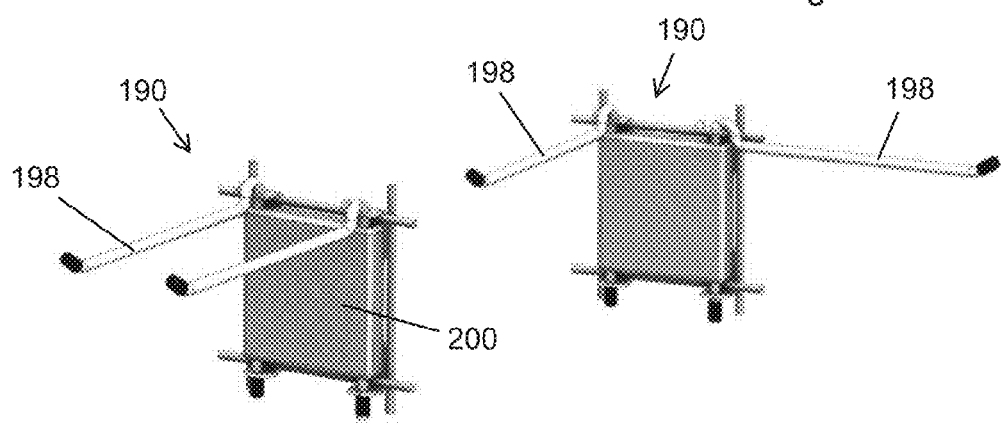

FIGS. 52-54 show a mount accessory 190 in which a mount plate 192 is disposed behind the body portion of the grid member and includes forwardly extending upper tabs 194 and lower tabs 196. Wire form hooks 198 include vertical extents that slide down through aligned openings of the tabs 194 and 196 to hold the accessory to the grid member. Per FIG. 54, the hooks 198 may be selectively rotatable toward the grid member when not in use. For this purpose the upper tabs 194 include slots to hold the hooks 198 in the use position, and a hook need only be moved vertically upward slightly, out of the tab slot, to permit the rotation. A removable cover 200 may also be provided.

Figure 55:
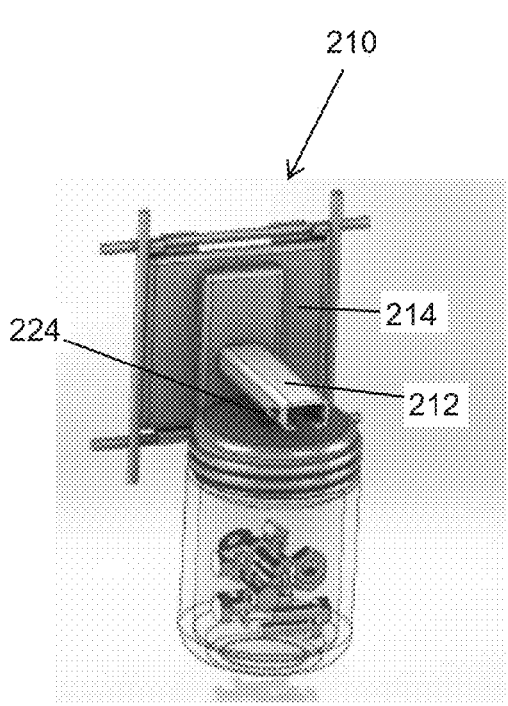
FIGS. 55-56 show another embodiment of a mount accessory.
Figure 56:
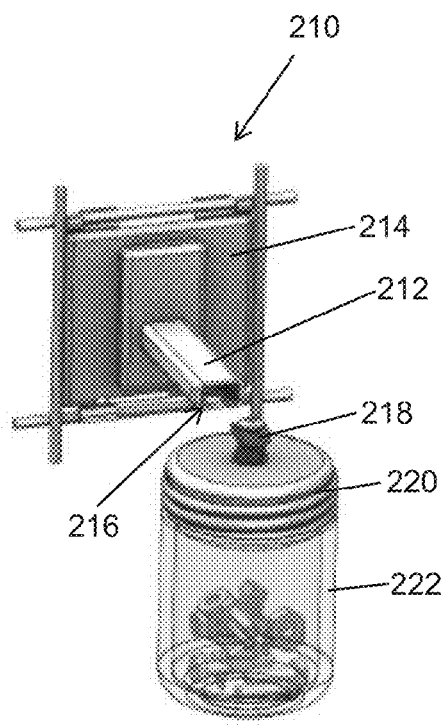

FIGS. 55 and 56 show a mount accessory 210 in which a support bar 212 extends forward of the mount panel 214 and forms a retention channel 216 with a bottom slot to enable the head 218 of another component to slide into and out of the channel 216 for support. Here the head 218 is an upward protrusion from the cap 220 of a jar 222, but other variations are possible. The channel may include a removable pin 224 that extends laterally across the channel to prevent the head 218 from being pulled out of the channel unless the pin 224 is moved out of the channel 216.

Figure 57:
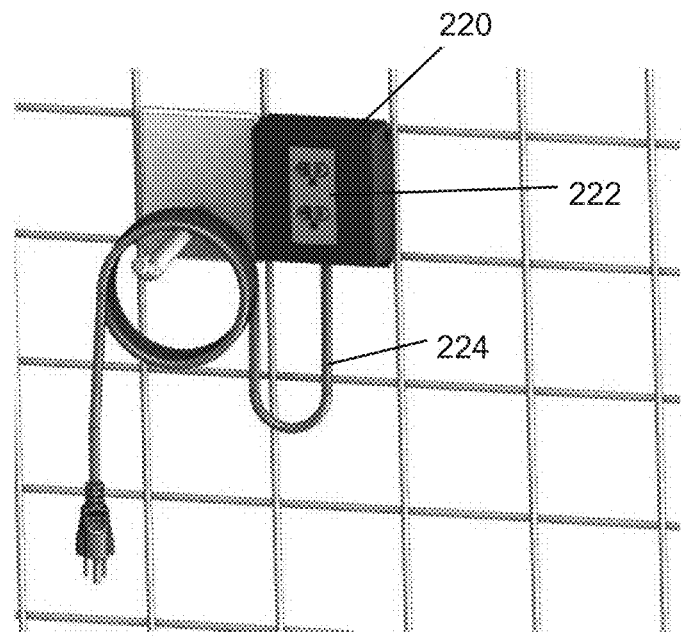
FIG. 57 shows another embodiment of a mount accessory.
Figure 58:
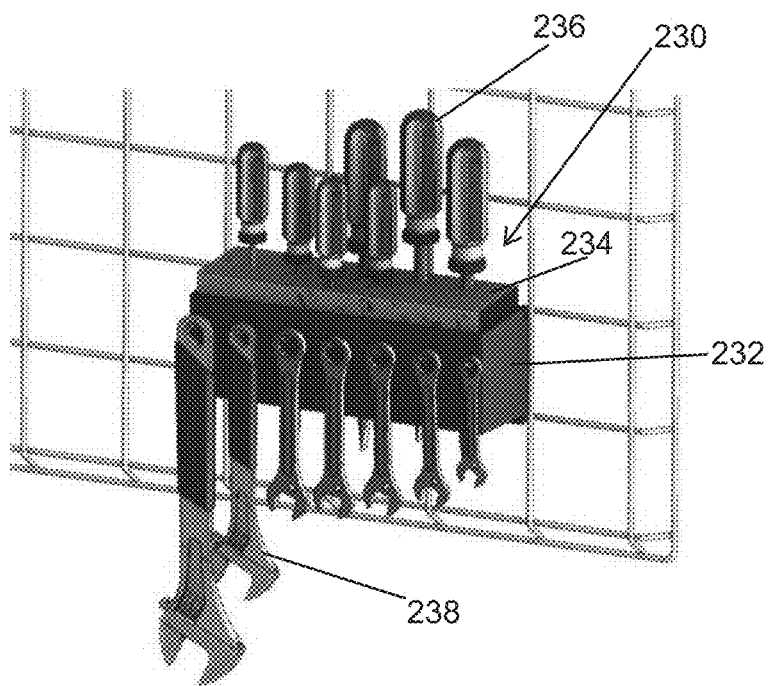
FIG. 58 shows another embodiment of a mount accessory.

FIG. 57 shows a mount accessory 220 in the form of a block that includes a standard, dual-socket electrical outlet 222 with an associated power cord 224 to enable accessible power from the grid member (e.g., the mount accessory 220 functions as an extension cord that is mountable to the grid member, which is useful for placement above a work surface). FIG. 58 shows a mount accessory 230 in the form of tool holding box 232 that includes a foam insert 234 for holding tools 236 (e.g., screwdrivers or other hand tools) and front pegs for hanging of tools 238 (e.g., wrenches or other hand tools).

Figure 59:
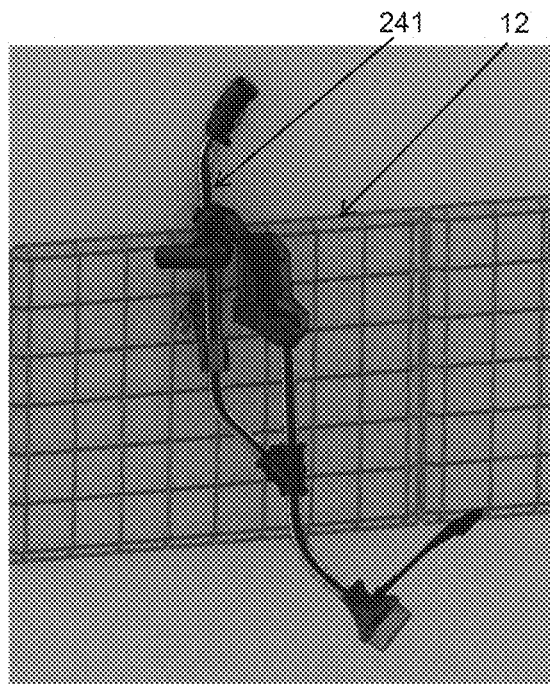
FIGS. 59-60 show one embodiment of a tool hanger.
Figure 60:
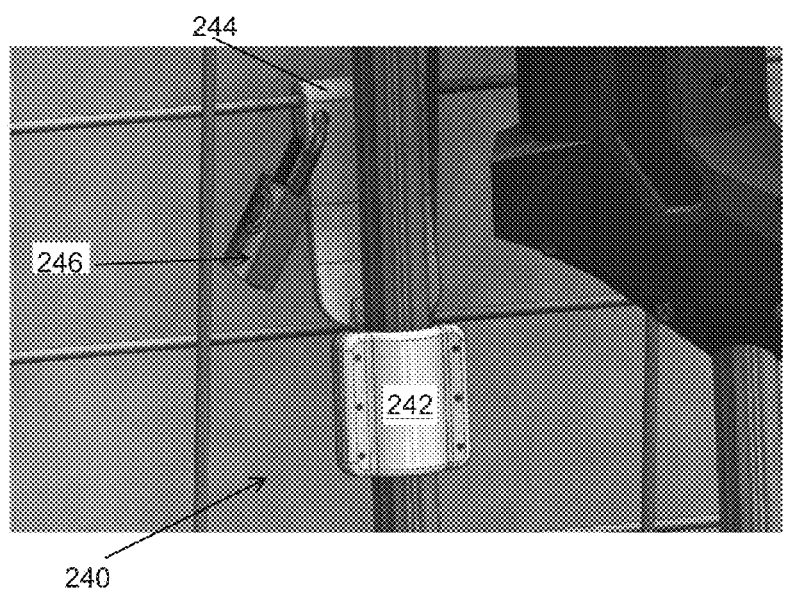

FIGS. 59 and 60 show a hook/hanger 240 that can be mounted onto a tool 241 (e.g., here onto the elongated bar of a power weeder) via a clamp bracket 242 and then used to hang the tool onto the grid member via a hang end 244. As shown, the hang end 244 may include a lockable feature to receive a padlock 246.

FIGS. 61-63 show another hook/hanger 250 that can be mounted onto a tool 252 (e.g., here the elongated shaft of a shovel) via a set of loop straps 254 and then used to hang the tool onto the grid member via a hang end 256 that is formed with a hang channel. As suggested in FIG. 63, the hook/hanger 250 can come in a variety of sizes adapted for different tools.

It is to be clearly understood that the above description is intended by way of illustration and example only, is not intended to be taken by way of limitation, and that other changes and modifications are possible.

What is claimed is:

1. A wall mounted object support system, comprising:
a grid member including a peripheral portion proximate a wall and a body portion offset from the peripheral portion and spaced further away from the wall than the peripheral portion, the grid member formed by a plurality of spaced apart first elongated rod or wire portions each running in a first direction and a plurality of spaced apart second rod or wire portions each running in a second direction that is substantially perpendicular to the first direction;
a plurality of support blocks, each support block connected to both the peripheral portion and the body portion;

wherein each support block includes a portion disposed between the peripheral portion and the wall to hold the peripheral portion in spaced relation proximate to the wall;

wherein each support block includes at least first and second anchor components pivotably associated with the support block, each of the first and second anchor components pivotable for movement between a non-anchoring orientation relative to the wall and an anchoring orientation, where in the anchoring orientation a curved retainer of the first anchor component is inserted within the wall and a curved retainer of the second anchor component is inserted within the wall.

2. The wall mounted object support system of claim 1 wherein the first and second anchor components are configured such that when both the first and second anchor components are in respective anchoring orientations, the curved retainers oppose each other within the wall to form a jaw-type gripping action of the wall.

3. The wall mounted object support system of claim 1 wherein each of the first and second anchor components has a pivot axis that is offset from the wall by at least one-half inch.

4. The wall mounted object support system of claim 1 wherein each of the first and second anchor components is pivotably connected with the body portion of the grid member.

5. The wall mounted object support system of claim 1 wherein each support block includes a releasable cover, and the first and second anchor components are disposed behind the releasable cover.

6. The wall mounted object support system of claim 5 wherein, for each support block, the releasable cover must be released to enable the first and second anchor components to be moved to respective non-anchoring orientations.

7. The wall mounted object support system of claim 1 wherein each support block includes a slot that snap-fits onto one of the first elongated rod or wire portions.

8. The wall mounted object support system of claim 7 wherein each slot includes an entry throat with a dimension smaller than a corresponding dimension of the first elongated rod or wire portion to which it is connected.

9. The wall mounted object support system of claim 1 wherein the first plurality of elongate wire or rod portions and the second plurality of elongate rod or wire portions together form a plurality of rectangular mount zones arranged in an array.

10. The wall mounted object support system of claim 9, further comprising:
a mount accessory including a mount panel configured to retainably engage within any one of the rectangular mount zones so as to be selectively positionable within any one of the rectangular mount zones.

11. The wall mounted object support system of claim 10 wherein the mount panel includes an upper slot for engaging with an upper wire or rod segment of a rectangular mount zone and a lower slot for engaging with a lower wire or rod segment of the rectangular mount zone.

12. The wall mounted object support system of claim 11 wherein the lower slot includes an upper support surface that rests on the lower wire or rod segment when the mount panel is retainably engaged within the rectangular mount zone.

13. The wall mounted object support system of claim 12 wherein the upper slot includes a lower stop surface that is spaced from the upper wire or rod segment when the mount panel is retainably engaged within the rectangular mount zone, enabling the mount panel to be shifted vertically upward within the rectangular mount zone such that the lower slot clears the lower wire or rod segment to enable pivoting of the mount panel out of the rectangular mount zone.

14. The wall mounted object support system of claim 13 wherein the mount accessory includes a movable retaining mechanism having a retaining position and a non-retaining position, in the retaining position the retaining mechanism inhibits vertically upward shifting of the mount panel within the rectangular mount zone.

15. The wall mounted object support system of claim 10 wherein the mount accessory includes at least one of (i) a support hook or support arm protruding forward from the mount panel, (ii) a wedge mount bracket protruding forward from the mount panel, (iii) a basket structure or bin structure or shelf structure protruding forward from the mount panel or (iv) a power outlet component or lighting component facing forward from the mount panel.

16. The wall mounted object support system of claim 10 wherein the mount panel includes at least one releasable retainer that interacts with one or more of the elongated wire or rod portions to hold the mount accessory within a rectangular mount zone.

17. A wall mountable storage system, comprising:
a first grid member including a first plurality of elongated rod or wire portions arranged to form a first plurality of rectangular mount zones in a first array, each rectangular mount zone of the first array having a height dimension A and a lateral dimension B;
a second grid member including a second plurality of elongated rod or wire portions arranged to form a second plurality of rectangular mount zones in a second array, each rectangular mount zone of the second array having a height dimension A and a lateral dimension B;
wherein a peripheral portion of the first grid member includes multiple partial mount zones, and a peripheral portion of the second grid member includes multiple partial mount zones,
when the second grid member is arranged peripherally adjacent to the first grid member with a given one partial mount zones of the second grid member adjacent to and in alignment with a given one of the partial mount zones of the first grid member, the adjacent and aligned partial mount zones form a rectangular mount zone with a height dimension A and a lateral dimension B.

18. The wall mountable storage system of claim 17 wherein a ratio of a surface area size in front elevation view of the first grid member over a surface area size in front elevation view of the second grid member results in a whole number.

19. The wall mountable storage system of claim 17, further comprising:
a third grid member including a third plurality of elongated rod or wire portions arranged to form a third plurality of rectangular mount zones in a third array, each rectangular mount zone of the third array having a height dimension A and a lateral dimension B;
a fourth grid member including a fourth plurality of elongated rod or wire portions arranged to form a fourth plurality of rectangular mount zones in a fourth array, each rectangular mount zone of the fourth array having a height dimension A and a lateral dimension B;
wherein a first peripheral corner portion of the first grid member includes a first partial mount zone, a second peripheral corner portion of the second grid member includes a second partial mount zone, a third peripheral corner portion of the third grid member includes a third partial mount zone and a fourth peripheral corner portion of the fourth grid member includes a fourth partial mount zone;

when the first, second, third and fourth grid members are arranged proximate each other with the first, second, third and fourth corner portions adjacent and aligned, the first, second, third and fourth partial mount zones together form a rectangular mount zone with a height dimension A and a lateral dimension B.

20. A wall mounted object support system, comprising:

a first supporting member including a plurality of first mount zones, the first supporting member mounted to the wall by a plurality of wall anchors; and the first mount zones have a predefined size;

a second supporting member including a plurality of second mount zones, the second supporting member mounted to the wall by a plurality of wall anchors, the second mount zones also have the predefined size;

wherein a peripheral portion of the first supporting member includes multiple partial mount zones, and a peripheral portion of the second supporting member includes multiple partial mount zones, when the second supporting member is arranged peripherally adjacent to the first supporting member with a first partial mount zone of the first supporting member adjacent to and in alignment with a second partial mount zone of the second supporting member, the adjacent and aligned first partial mount zone and second partial mount zone form a complete mount zone having the predefined size.

* * * * *